United States Patent
Terzini

(10) Patent No.: US 12,459,697 B2
(45) Date of Patent: Nov. 4, 2025

(54) ITEM PACKAGING MACHINE

(71) Applicant: Tension International, Inc.

(72) Inventor: Robert Terzini, Corinth, TX (US)

(73) Assignee: Tension International, Inc., Kansas City, MO (US)

( * ) Notice: Subject to any disclaimer, the term of this patent is extended or adjusted under 35 U.S.C. 154(b) by 0 days.

(21) Appl. No.: 19/067,010

(22) Filed: Feb. 28, 2025

(65) Prior Publication Data

US 2025/0276821 A1 Sep. 4, 2025

Related U.S. Application Data

(60) Provisional application No. 63/559,676, filed on Feb. 29, 2024.

(51) Int. Cl.
*B65C 9/42* (2006.01)
*B65C 1/02* (2006.01)
*B65C 9/40* (2006.01)

(52) U.S. Cl.
CPC ............. *B65C 9/42* (2013.01); *B65C 1/02* (2013.01); *B65C 2009/408* (2013.01); *B65C 2210/0094* (2013.01)

(58) Field of Classification Search
CPC ....... B65C 9/42; B65C 1/02; B65C 2009/408; B65C 2210/0094
See application file for complete search history.

(56) References Cited

U.S. PATENT DOCUMENTS

| | | | |
|---|---|---|---|
| 5,834,706 A * | 11/1998 | Christ | G01G 15/001 177/1 |
| 7,527,205 B2 | 5/2009 | Zhu et al. | |
| 7,918,402 B2 * | 4/2011 | Conlon | G06Q 10/087 705/28 |
| 9,352,872 B2 * | 5/2016 | Wojdyla | B65C 9/1826 |
| 9,937,100 B1 * | 4/2018 | Joplin | B65B 61/20 |
| 10,669,098 B1 * | 6/2020 | Terzini | G06Q 10/08 |
| 11,345,547 B1 * | 5/2022 | Terzini | B65C 47/50 |
| 11,370,575 B2 * | 6/2022 | Wen | B65C 9/44 |
| 11,383,874 B2 * | 7/2022 | Wen | B65C 1/021 |
| 11,518,567 B2 * | 12/2022 | Solanki | B65C 9/26 |
| 11,873,130 B2 * | 1/2024 | Wen | B65C 9/36 |
| 2004/0123564 A1 | 7/2004 | McErlean et al. | |

(Continued)

FOREIGN PATENT DOCUMENTS

JP   2023011654 A   1/2023

*Primary Examiner* — Patrick H Mackey
(74) *Attorney, Agent, or Firm* — AVEK IP, LLC; Kent R. Erickson

(57) ABSTRACT

An item packaging machine is configured to fulfill a plurality of orders that each include one or more items. The item packaging machine includes an introduction assembly configured to index each item in a retaining notch that is advanced by a conveyor over a base. The conveyor advances each item to a label applicator assembly, where each item is verified by one or more cameras directed to at least one side of each item and a label is applied to each item. The conveyor advances each labeled item to a packaging assembly, where each item is verified and advanced into a package that includes order identification information applied thereon and that is configured to package the order that includes the item.

21 Claims, 22 Drawing Sheets

(56) References Cited

U.S. PATENT DOCUMENTS

| | | | |
|---|---|---|---|
| 2007/0126578 A1* | 6/2007 | Broussard | G06Q 10/087 705/28 |
| 2013/0174960 A1* | 7/2013 | Goetz | B65C 9/26 156/64 |
| 2016/0052659 A1* | 2/2016 | Bowers | B65C 1/021 156/64 |
| 2018/0221244 A1* | 8/2018 | Joplin | B65B 61/20 |
| 2022/0097892 A1* | 3/2022 | Wen | B65C 9/44 |

* cited by examiner

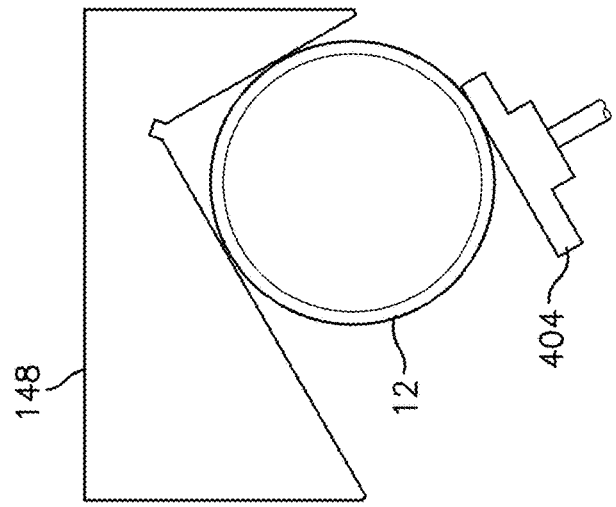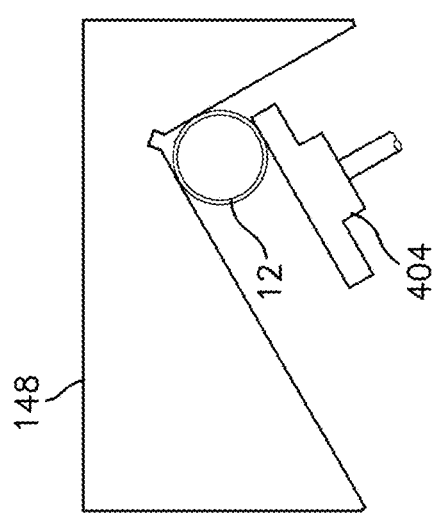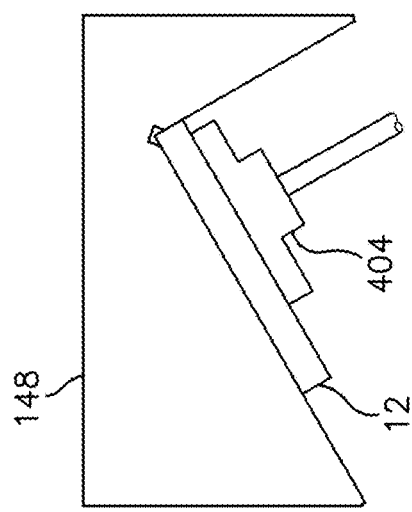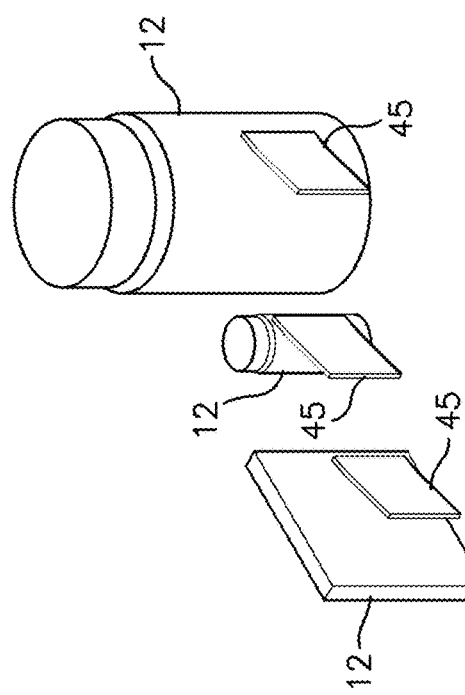

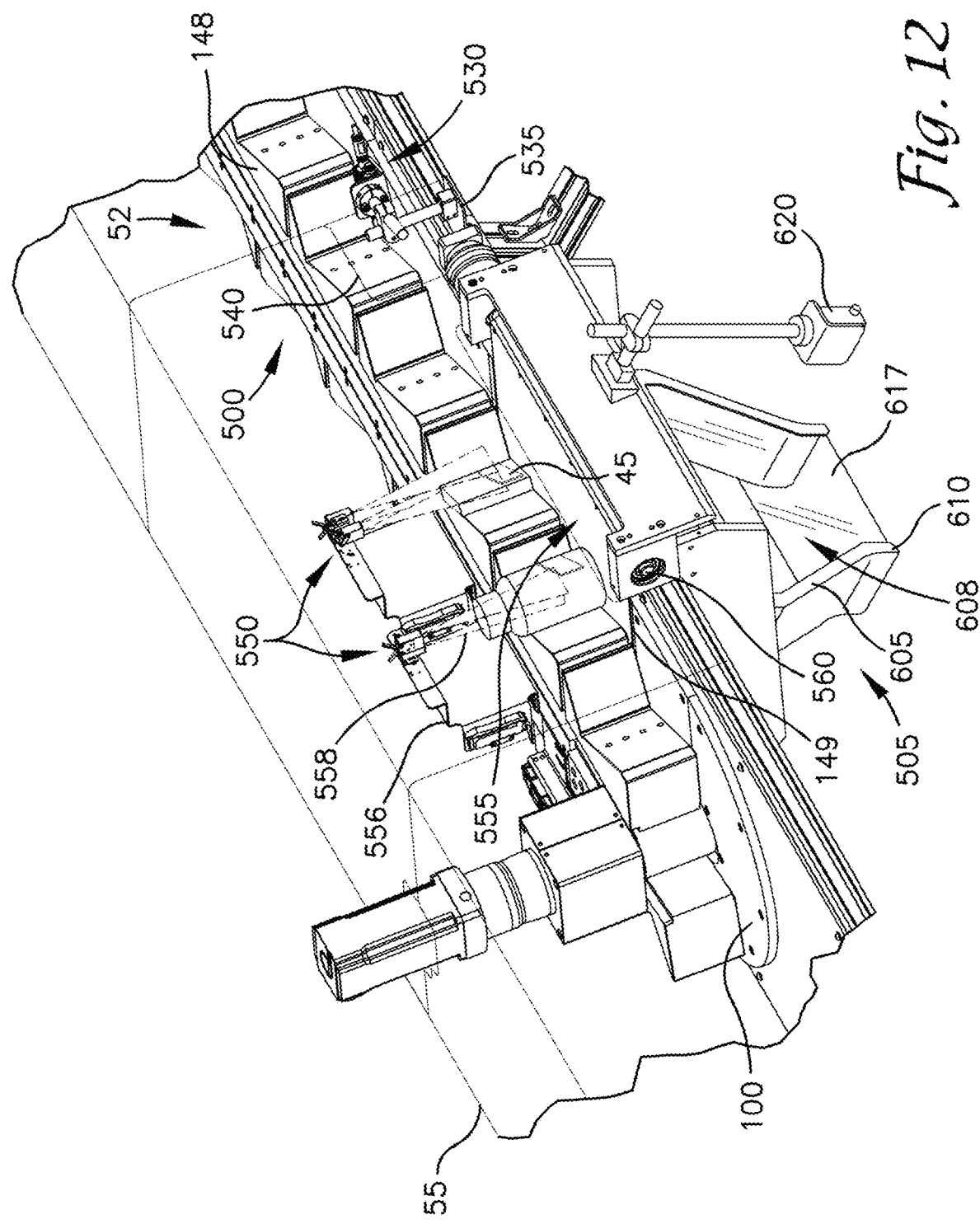

ITEM PACKAGING MACHINE

CROSS-REFERENCE TO RELATED APPLICATIONS

This application claims the benefit of U.S. Provisional Patent Application No. 63/559,676 filed Feb. 29, 2024, the disclosure of which is hereby incorporated herein in its entirety by reference.

BACKGROUND OF THE INVENTION

Field of the Invention

This invention relates generally to packaging machines, and more specifically to an assembly and method for verifying and packaging pharmaceutical items.

Background

Various solutions exist for labeling and packaging items in order fulfillment operations. In traditional prescription fulfillment operations, a packaging clerk and/or a pharmacist labels a bag, verifies a prescription, labels the prescription, and packs the prescription and associated documentation in the bag for shipping.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

The embodiments described herein relate to an item packaging machine configured to fulfill a plurality of orders. Each of the plurality of orders includes one or more items, each having an item identifying indicia thereon. A processing system accesses order information associated with each of the plurality of orders and includes order identifying indicia for each of the plurality of orders. A conveyor is configured to advance the one or more items through the item packaging machine, and the conveyor forms a conveyor run on which each of the one or more items are advanced. An introduction assembly is configured to associate an indexed position of each of the one or more items positioned on the conveyor run with item identifying information for the item at the respective indexed position. A label applicator is positioned proximate to a labeling station on the conveyor run, and a least one labeling verification camera is positioned proximate the label applicator and in communication with the processing system. Upon each of the items being advanced to the labeling station, the processing system causes the at least one labeling verification camera to capture the item identifying indicia on the item at the labeling station, and if the item identifying indicia captured from the item at the labeling station corresponds to the item identifying indicia associated in the processing system with the item expected at the labeling station based upon the indexed position of the item in the processing system, the processing system causes the label applicator to apply to the item a label with customer identifying indicia associated with the item printed thereon. Thereafter, the processing system causes the at least one labeling verification camera to capture at least one image of the item wherein the at least one image includes the item identifying indicia and at least a portion of the label including the customer identifying indicia thereon. A packaging verification camera is positioned proximate to a packaging verification station on the conveyor run proximate a packaging assembly operable to advance the item from the packaging verification station into a package, and the packaging verification camera and the packaging assembly are in communication with the processing system. The processing system causes the packaging verification camera to capture the item identifying indicia on the item or the customer identifying indicia on the label at the packaging verification station, and if the item identifying indicia or the customer identifying indicia captured from the item at the packaging verification station corresponds to the item identifying indicia associated in the processing system with the item expected at the packaging verification station based upon the indexed position of the item in the processing system, the processing system causes the packaging assembly to advance the item into a package and to apply the order identifying information for the order to the package.

In an embodiment, the conveyor further includes a plurality of V-shaped blocks, and the indexed position of the item corresponds to one of the plurality of V-shaped blocks.

In an embodiment, the introduction assembly includes an introduction camera that is communicatively coupled to the processing system. The processing system causes the introduction camera to capture an image of the item identifying indicia on each of the items as the item is advanced into one of the indexed positions on the conveyor run to associate the item identifying indicia with the indexed position and to verify the item identifying indicia corresponds to the item identifying indicia of one of the one or more items in the order.

In an embodiment, a display is communicatively coupled to the processing system. Upon capturing the image of the item identifying indicia of the item by the introduction camera, the display provides a prompt indicating an orientation of the item identifying indicia on the item relative to the conveyor when positioned on the conveyor run.

In an embodiment, the at least one labeling verification camera includes a set of six labeling verification cameras, and each of the six labeling verification cameras is positioned relative to the labeling station to image a different side of the item.

In an embodiment, the label applicator is mounted for movement along at least two axes, and two of the axes extend in a plane extending generally perpendicular to the conveyor run across the labeling station.

In an embodiment, the conveyor run across the labeling station includes an item receiving platform advanceable along an axis perpendicular to the conveyor run across the labeling station for raising or lowering the item receiving platform relative to the conveyor run at the labeling station. The at least one labeling verification camera includes a set of six labeling verification cameras wherein each of the six labeling verification cameras is positioned relative to the labeling station to image a different side of the item on the item receiving platform.

In an embodiment, the order information accessed by the processing system includes a print file including the customer identifying indicia and patient-specific information for each of the one or more items in the order to be printed on the label, a location for applying the label containing the patient-specific information and the customer identifying indicia relative to a side of the item positioned on the item receiving platform, and a position of the item receiving platform relative to the conveyor run to position the item so that one of the six labeling verification cameras can capture an image of the side of the item on which the item identifying information is located.

In an embodiment, the packaging assembly further includes a document verification camera positioned proximate to the packaging assembly and in communication with the processing system. The processing system causes the document verification camera to capture an image of a document verification indicia applied to one or more patient information documents associated with at least one of the items in the order and to compare the document verification indicia captured by the document verification camera to the document verification indicia associated with each of one or more patient information documents associated with the order in the processing system prior to insertion of the one or more patient information documents into the package for each order.

The embodiments described herein relate to a method of fulfilling a plurality of orders that each include one or more items for processing in an item packaging machine. The method includes retrieving from a database, order information regarding an order including item identification information corresponding to each of the one or more items contained in the order and customer information of a customer associated with the order. The method further includes imaging an item identification indicia of each of the one or more items in succession, wherein each item identification indicia is associated with the item identification information for a respective one of the items in the order. For each of the one or more items whose item identification indicia is imaged, the method includes prompting placement of the item onto a conveyor in a specified orientation. The method further includes positioning the item of the order onto the conveyor with the item identification indicia on the item in the specified orientation and at a specified position on the conveyor. Still further, the method includes conveying the item to a verification position on the conveyor. At the verification position, the method includes imaging the item identification indicia on the item and comparing the item identification indicia to the item identification information in the order information retrieved from the database, and if the item identification indicia on the item corresponds to the item identification information in the order, applying customer information associated with the item of the order to the item. After applying the customer information to the item and with the item at the verification position, the method includes capturing verification images that include an image of the item identification indicia on the item and an image of the customer information applied to the item.

In an embodiment, the item identification indicia and the customer information are imaged simultaneously.

In an embodiment, the verification position is on a vertically moving platform.

In an embodiment, the method includes performing a pharmaceutical verification of the item. The pharmaceutical verification includes: imaging a selected side of the item prior to applying the customer information to the item; compiling into a file the verification images, the image of the selected side of the item prior to applying the customer information thereto, and a pre-existing image from the item identification information from the database that corresponds to the selected side of the item; comparing the images in the file with at least the item identification information retrieved from the database; and confirming the item is the item in the order or sending the item to be reviewed.

In an embodiment, the order information retrieved from the database includes address information for the customer. The method further includes conveying the item to a packaging verification position. At the packaging verification position, the method includes imaging the customer information on the item and comparing the customer information to the item identification information in the order information retrieved from the database and if the customer information on the item at the packaging verification position corresponds to the item identification information in the order for the item expected at the packaging verification position, the method includes advancing the item into a package. Still further, the method includes applying the address information for the customer on the package into which the item is to be placed.

In an embodiment, the order information retrieved from the database includes order identification indicia, and the method further includes applying the order identification indicia on the package into which the item is to be placed and imaging the order identification indicia.

The embodiments described herein relate to a method of fulfilling a plurality of orders that each include one or more items for processing in an item packaging machine. The method includes receiving an order container at an item introduction assembly containing one or more items corresponding to an order and imaging a container identification indicia of the order container. The method further includes retrieving from a database order information associated with the container identification indicia imaged at the item introduction assembly. The order information corresponds to the order, including the one or more items contained in the order container imaged at the item introduction assembly. The method further includes imaging an item identification indicia of each of the one or more items retrieved in succession from the order container. For each of the one or more items whose item identification indicia is imaged, the method includes prompting placement of the item onto a conveyor in a specified orientation. The method further includes placing the item onto the conveyor in a specified position in the specified orientation. The method further includes verifying a presence of the item on the conveyor. Still further, the method includes indexing the specified position of the item on the conveyor. The method further includes incrementally advancing the conveyor with the item in the specified position towards a labeling position. Upon advancement of the item to the labeling position, the method includes verifying the item and the specified orientation of the item by imaging the item identification indicia on the item and comparing the item identification indicia to the order information and to the item expected in the specified position. The method further includes applying patient-specific information to the item in the labeling position. The method further includes verifying the item by imaging, in the labeling position, the patient-specific information applied to the item and comparing the patient-specific information to the order information. Still further, the method includes incrementally advancing the conveyor with the item in the specified position towards a packaging assembly. At the packaging assembly, the method includes verifying the item by imaging the patient-specific information applied to the item and comparing the patient-specific information to the order information and to the item expected in the specified position. The method further includes applying order identification information to a package, and verifying the package by imaging the order identification information applied to the package and comparing the order identification information with the order information. Still further, the method includes advancing the one or more items of the order into the package. Still further, the method includes sealing the package.

In an embodiment, the conveyor includes a plurality of V-shaped blocks, and the specified position of the item corresponds to one of the plurality of V-shaped blocks.

In an embodiment, the method further includes verifying the item by imaging the item identification indicia of the item simultaneously with imaging of the patient-specific information applied to the item and comparing the item identification indicia to the order information.

In an embodiment, the method further includes verifying the item further includes imaging at least one surface of the item prior to applying the patient-specific information thereto. Still further, the method includes compiling a set of images that includes: the image of the patient-specific information applied to the item, the image of the item identification indicia of the item taken simultaneously with the image of the patient-specific information applied to the item, the image of the at least one surface of the item prior to applying the patient-specific information thereto, and at least one pre-existing image that corresponds to the image of the at least one surface of item. Still further, the method includes comparing the set of images with the order information. Yet still further, the method includes operating an input device to confirm the labeled item is the item in the order or send the item for review.

In an embodiment, the labeling position is on an item receiving platform that is vertically positionable in an upper position and a lowered position, and imaging in the labeling position is effected by a set of one or more cameras that are vertically positionable with the item receiving platform.

In an embodiment, the method further includes printing one or more patient information documents with one or more printers. Still further, the method includes imaging each of the one or more patient information documents to verify that the one or more patient information documents is associated with the one or more items of the order. The method further includes advancing the one or more patient information documents into the package prior to sealing the package.

BRIEF DESCRIPTION OF THE DRAWINGS

Embodiments of the invention are described in detail below with reference to the attached drawing figures.

FIG. 3 shows a rear perspective view of an embodiment of the IPM assembly, as shown in FIG. 1a.

FIGS. 11a-11c show schematic views of a tamp engaging items of different shapes and sizes and positioned in the retaining notch of the V-shaped block for application of the label to the item.

FIG. 11d shows a perspective view of the items shown in FIGS. 11a-11c with labels applied thereto.

FIG. 12 shows a front perspective view of an embodiment of a packaging assembly as shown in FIG. 1a, including an imaging device for verifying the item, a drop gate, and a chute through which an item or items are advanced into a package.

Figure 1A:
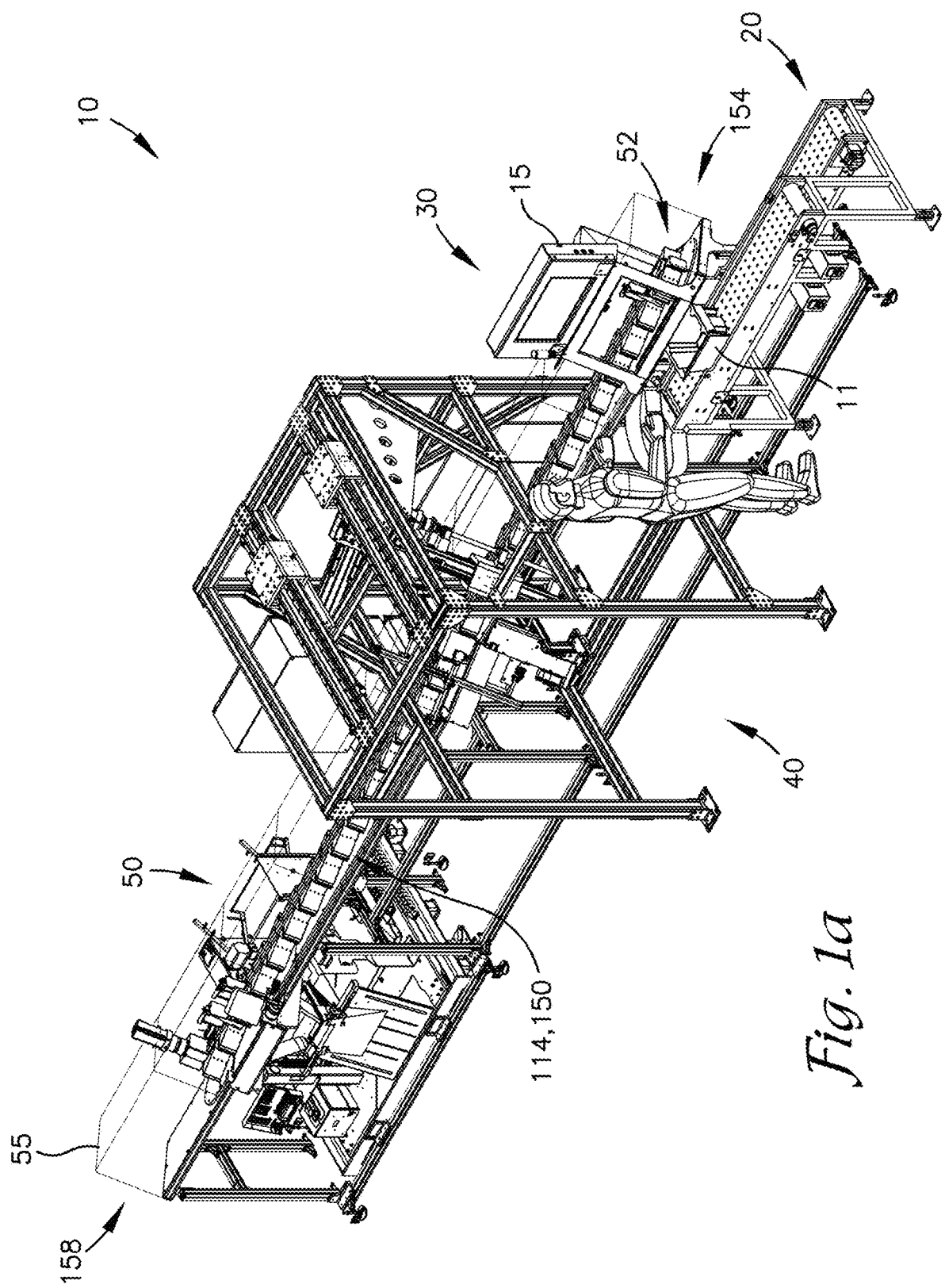
FIGS. 1a and 1b show front perspective views of embodiments of an item packaging machine assembly (the "IPM assembly").

The drawing figures do not limit the invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

The term capture, and variants thereof, may be used herein synonymously with variants of the terms image, read, and scan. The terms comprise translating indicia or light into an image or numbers or other information, and may further comprise accessing information associated with the indicia. The term may also comprise recording the translated indicia or light onto a digital medium or physical medium.

Figure 1B:
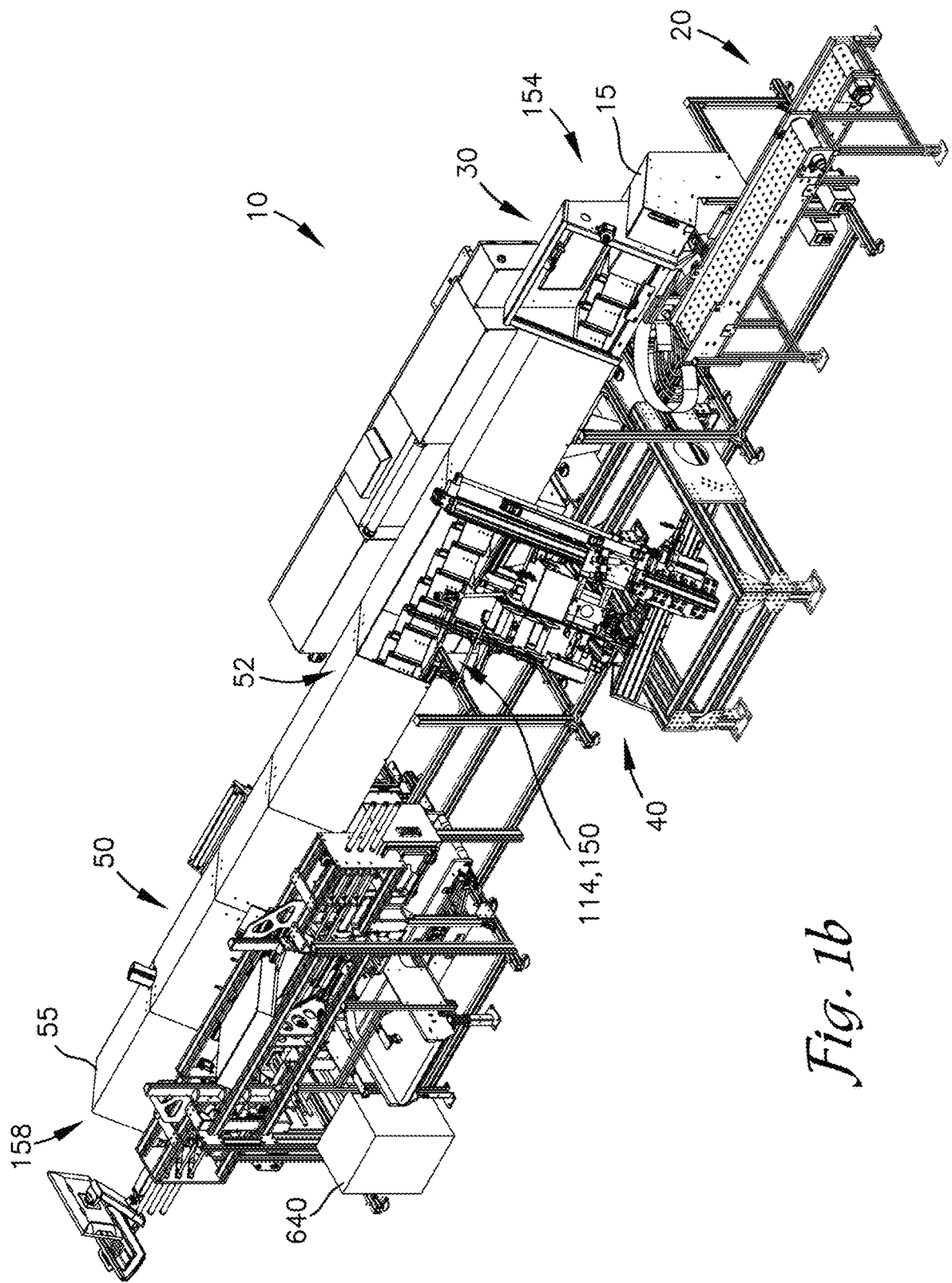

Embodiments of item packaging machines are shown in FIGS. 1a and 1b, which may each be referred to as an IPM assembly 10 and function similarly. The IPM assembly 10 described herein may be part of an order fulfillment system that is used to fulfill orders, such as, for example, orders for prescription and/or non-prescription pharmaceutical products or other products.

An order and corresponding order information is sent for each order to a database that is communicatively coupled to the order fulfillment system, which includes the IPM assembly 10. Each order corresponds to or is married to an item container or tote 11 that is configured to contain one or more items 12 of the order, and the tote 11 may contain a multi-item order, a single-item order, or multiple single-item orders. The order information is retrieved from the database and includes item identification information corresponding to each of the one or more items 12 contained in the order. Each item 12 in the order is picked, imaged, and placed into the tote 11, which may be referred to as picked-and-placed, by a process that includes imaging a tote identifying indicia 13 on the tote 11 to verify or confirm that the item 12 that is picked-and-placed into the tote 11 corresponds to the item identification information of one of the one or more items 12 in the order. A plurality of totes 11, each containing one or more orders, is delivered to the IPM assembly 10 and singulated for fulfillment of each order.

Figure 2:
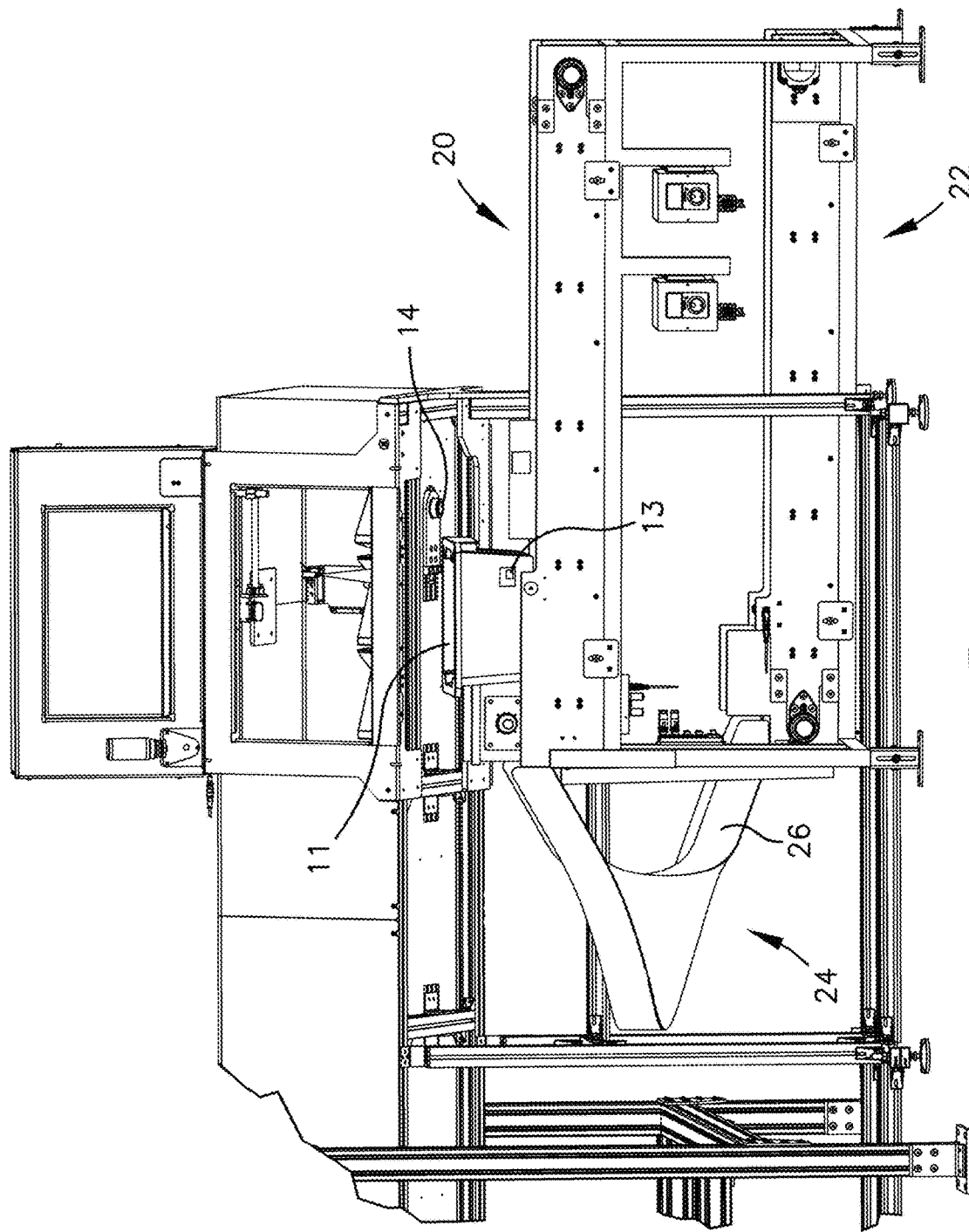
FIG. 2 shows a front perspective of an embodiment of a tote delivery conveyor as shown in FIGS. 1a and 1b, with a tote positioned thereon, for delivery of totes to the IPM assembly, and a chute and a tote recovery conveyor for advancing totes away from the item packaging machine.

As shown in FIG. 2, each tote 11 includes the tote identifying indicia or identification tag 13, such as a radio frequency identification ("RFID"), a quick response ("QR") code, or a barcode, that corresponds to the one or more orders contained in the tote 11. Prior to introducing and processing the item or items 12 of the one or more orders in the tote 11 into the IPM assembly 10, the identification tag 13 is read by an identification tag reader or identification imager 14. The identification tag reader captures or reads a bar code or other indicia on the identification tag 13 on the tote 11 which is communicated to a processing system or director 15 of the IPM assembly 10. The processing system 15 is configured to communicate with components or assemblies of the IPM assembly 10 and/or with a processing system of the order fulfillment system. The processing system 15 retrieves the order information from the database for the order or orders that correspond to the bar coder or other indicia on the identification tag 13 of the tote 11, including item identification information corresponding to each of the one or more items 12 contained in each order, packaging information, and labeling information that includes customer information for a customer or patient that is associated with each item of the order.

Each tote 11 is singulated and delivered to the IPM assembly 10 via a tote delivery conveyor 20. Singulation may be by a manual process or automated process known in the art. After all the or one or more items 12 of the one or more orders are removed from the tote 11, the tote 11 is advanced to a tote recovery conveyor 22 via a transition member or chute 24. In an embodiment, when each of the items 12 of the one or more orders in the tote 11 are inducted into the IPM assembly 10, the tote delivery conveyor 20 automatically advances the tote 11 to the tote recovery conveyor 22, and a new tote 11 is delivered to the IPM assembly 10 via the tote delivery conveyor 20. In an embodiment shown in FIG. 2, the chute 24 includes guide walls 26 that guide each tote 11 toward the tote recovery conveyor 22 positioned in a plane below the tote delivery conveyor 20. In an embodiment, the chute 24 is curved towards the tote recovery conveyor 22, and each tote 11 slides down the chute 24 to the tote recovery conveyor 22 that returns the totes 11 for reuse in the order fulfillment system.

Referring to FIGS. 1a and 1b, the IPM assembly 10 includes components or assemblies that carry out a sequence of operations to fulfill an order, including an item introduction or induction assembly 30 that indexes a position of each item or product 12 introduced into the IPM assembly 10, a verification assembly or label application assembly 40 that images and verifies each item 12 and may include an operation to apply patient-specific information to the item 12, such as via a label 45, and a packaging assembly 50 that performs one or more of the following operations: verifying and packaging of each item 12, printing and packaging patient information documents, if required, that corresponds to each item 12 and/or each order, and printing order identification information on the packaging, including order identification indicia that corresponds to the order and/or address information, such as a patient name and an order ship-to address. Each component is modular, meaning that each component is a self-contained unit, and may be arranged flexibly relative to the order fulfillment system to carry out the corresponding operation.

Figure 3:
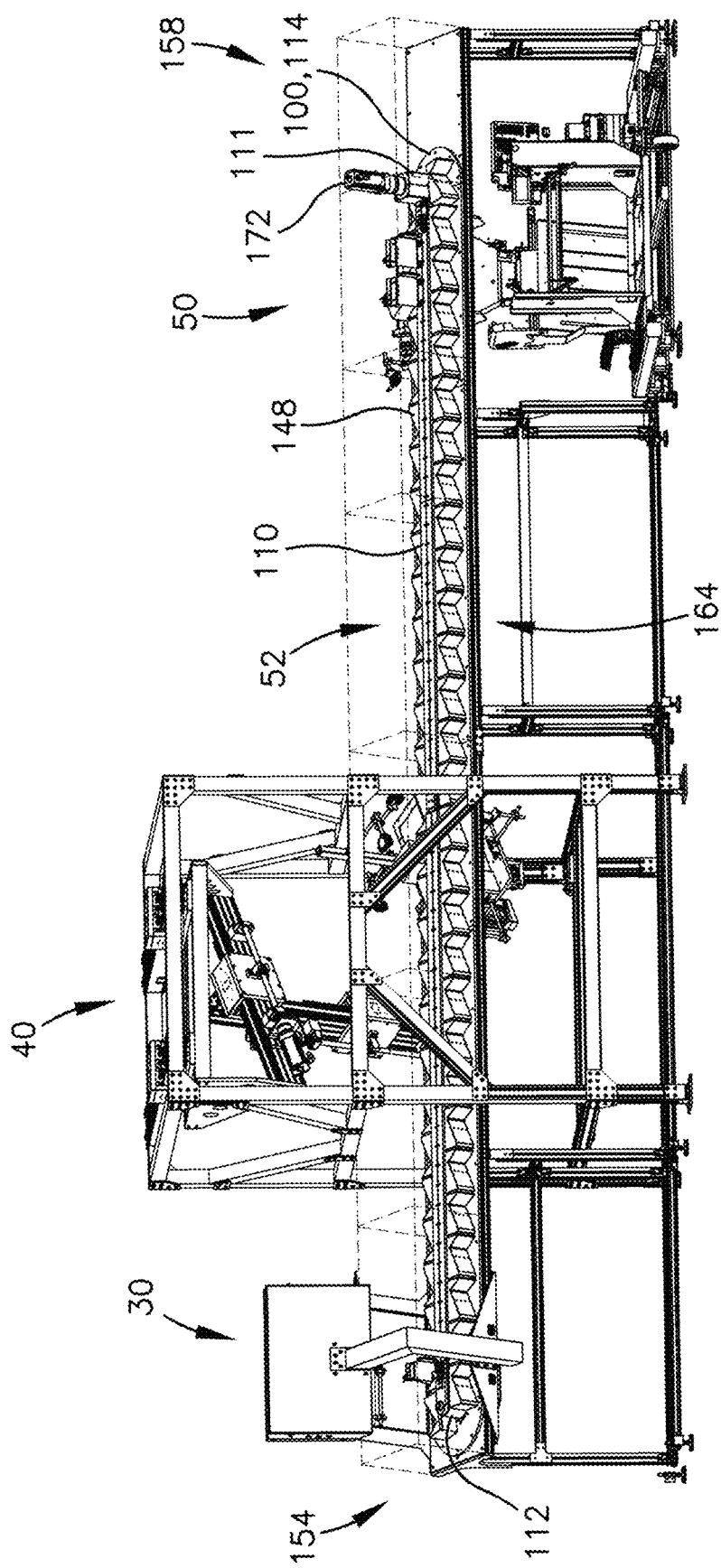
Figure 8:
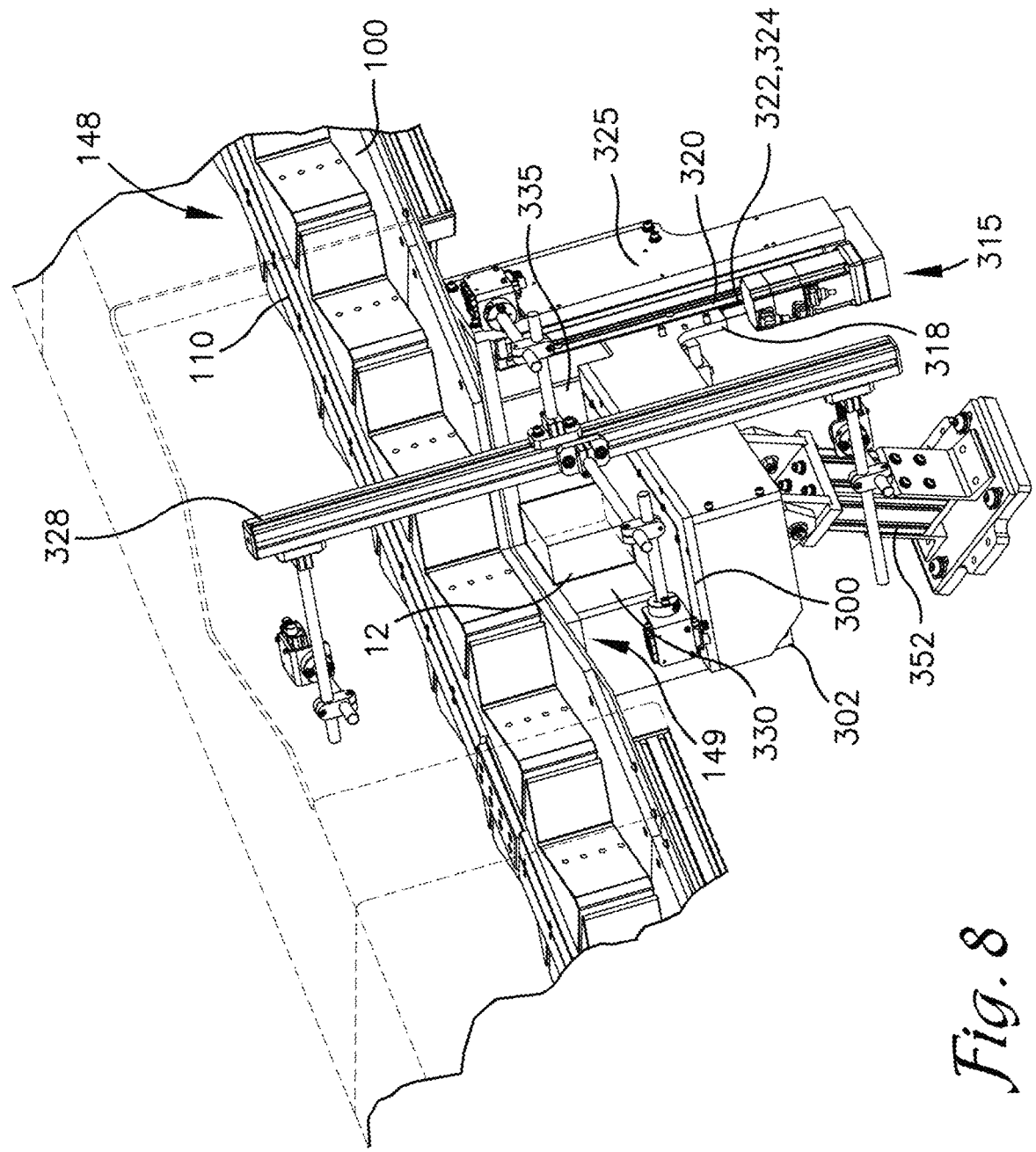
FIG. 8 shows a front and side perspective view of the label applicator assembly of the IPM assembly shown in FIGS. 1a and 1b, including the lowerator platform in a lowered position and with the label applicator removed.

The IPM assembly 10 includes an item indexing conveyor 52 that conveys or advances each item 12 between the components of the IPM assembly 10. The operations of the IPM assembly 10 are coordinated, and the item indexing conveyor 52 advances when the operation in each of the item induction assembly 30, label applicator assembly 40, and packaging assembly 50 are completed in each cycle. In an embodiment, a conveyor housing 55 extends in covering relationship with the item indexing conveyor 52. As best shown in FIG. 3, the item indexing conveyor 52 includes a base 100 and an edge mounted conveyor 110. In an embodiment, the base 100 forms a conveyor run 114, which extends from at least the item induction assembly 30 to at least the label applicator assembly 40 and the packaging assembly 50, and items 12 are driven or advanced on the conveyor run 114 by a plurality of consecutively aligned vee- or V-shaped blocks 148. The edge mounted conveyor 110 projects vertically upward from the base 100 and relative to the base 100 and rotates around a drive roller 111 at one end and an idler roller 112 at an opposite end. The plurality of V-shaped blocks 148 are coupled to the edge mounted conveyor 110, spaced above the base 100 such that as the edge mounted conveyor 110 is driven, the plurality of V-shaped blocks 148 advance over the base 100 and completely around the edge mounted conveyor 110. The base 100 may include one or more openings 149 (see FIGS. 8 and 12) through or below which an assembly for an operation may be installed.

Each of the plurality of V-shaped blocks 148 is able to engage an item 12 introduced or inducted into the IPM assembly 10 and advance the item 12 on an operations side or front or first longitudinal side 150 of the conveyor run 114 from the item induction assembly 30 proximate a first end 154 to the packaging assembly 50 proximate a second end 158. In an embodiment shown in FIG. 3, after each item is advanced into the packaging assembly 50, each of the plurality of V-shaped blocks 148, empty and without an item 12 retained thereby, is conveyed around the second end 158, along a rear or second longitudinal side 164, and then around the first end 154 of the item indexing conveyor 52. Driving means 172, such as a hydraulic motor 172 or another conveyor driver known in the art, is operably coupled to the drive roller 111 for driving the edge mounted conveyor 110 to which the plurality of V-shaped blocks 148 are coupled.

Figure 4:
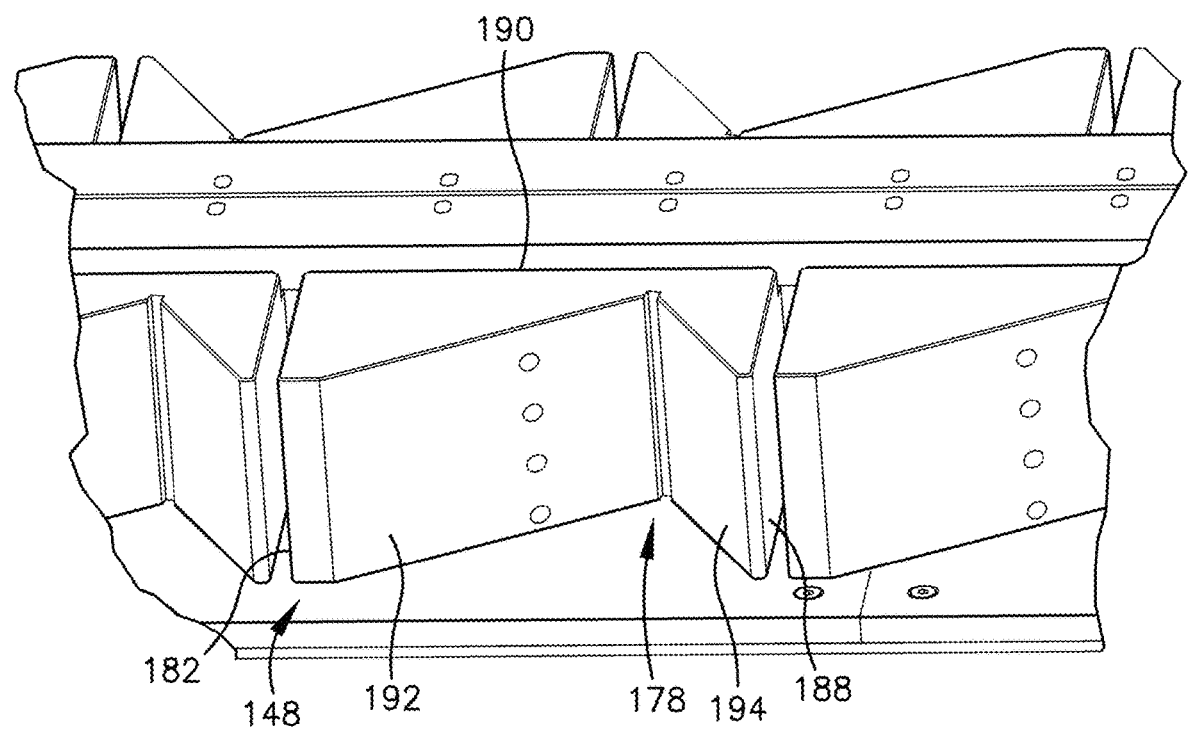
FIG. 4 shows a perspective view of an embodiment of a plurality of V-shaped blocks consecutively positioned on a base to index items on a conveyor run of the IPM assembly, as shown in FIGS. 1a and 1b.

FIG. 4 shows an embodiment of a V-shaped block 148 that is configured such that a plurality of V-shaped blocks 148 are consecutively positionable to advance indexed items 12 along the conveyor run 114 that are inducted into or placed in the IPM assembly 10. Each of the plurality of V-shaped blocks 148 is formed with a retaining notch 178 in which one item 12 may be positioned, a leading side 182, a trailing side 188, and an inner side 190 that is coupled to the edge mounted conveyor 110. The trailing side 188 of each leading V-shaped block 148 is positioned proximate to the leading side 182 of each following V-shaped block 148. The retaining notch 178 of each of the plurality of V-shaped blocks 148 is formed between or defined by a drop surface 192 and a pushing surface 194. The drop surface 192 is angled relative to the pushing surface 194 to retain an item 12 in the retaining notch 178, such that as each of the plurality of V-shaped blocks 148 with the item 12 retained in the retaining notch 178 is driven along the first longitudinal side 150, the item 12 does not rotate relative to the direction of conveyance of the item indexing conveyor 52 or move laterally relative to the V-shaped block 148 in which the item 12 is retained. In the embodiments shown in FIGS. 1a, 1b, and 3, the second longitudinal side 164 of the item indexing conveyor 52 is lower than the first longitudinal side 150, or the base 100 is angled downward relative to the first longitudinal side 150, such that an item 12 placed in the retaining notch 178 moves, through gravity, to a position in the retaining notch 178 that is adjacent to or proximate an intersection between the drop surface 192 and the pushing surface 194.

The item induction assembly 30 facilitates induction of each item into the IPM assembly 10, which includes retrieving order information from a database regarding each order, indexing a position of an item on the item indexing conveyor 52, directing placement of each item in a predetermined orientation on the item indexing conveyor 52, communicating labeling information and item identification information of each item 12 to the label applicator assembly 40, and communicating packaging information of each item 12 to the packaging assembly 50 that includes a document printing station. Indexing includes recording a position of the item 12 on the item indexing conveyor 52, or recording a position of the item 12 relative to other items 12, and communicating the indexed position to the label applicator assembly 40 and the packaging assembly 50 for verification of the item 12 as the item 12 advances through the label applicator assembly 40 and the packaging assembly 50.

Figure 6A:
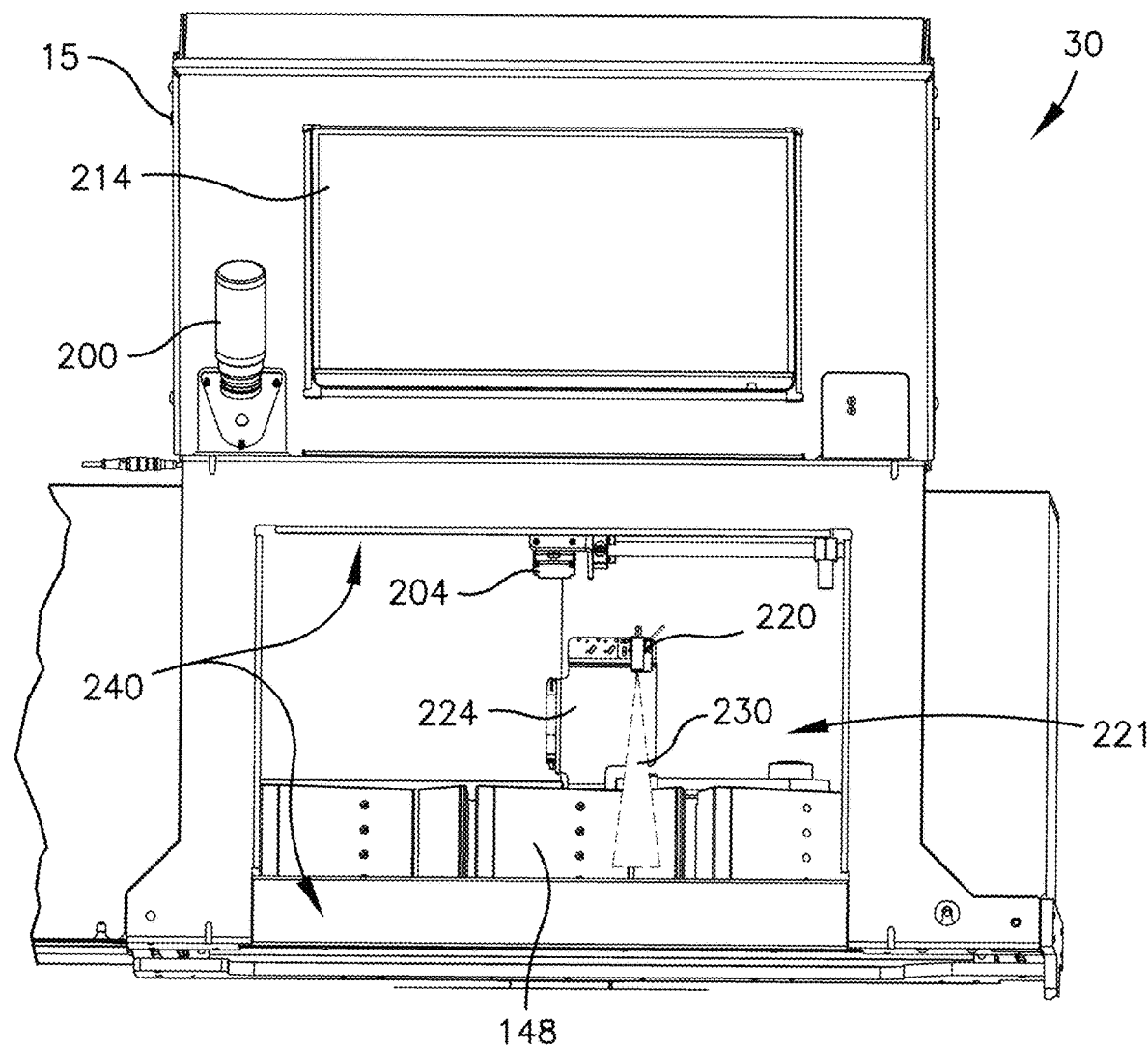
FIGS. 6a and 6b show front elevation views of embodiments of an item induction assembly of the IPM assembly shown if FIGS. 1a and 1b, respectively, including an optical imaging device, a processing system with a monitor, and a sensor for sensing a presence of each item introduced into the item induction assembly.

In an embodiment shown in FIG. 6a, the item induction assembly 30 includes an indexing cycle indicator 200, an optical imaging device 204, the processing system 15 with a monitor 214, and a sensor 220 for sensing a presence of each item introduced onto the item indexing conveyor 52. In an embodiment shown in FIG. 6b, the item induction assembly 30 is similar to the item induction assembly 30 shown in FIG. 6a, and also includes a housing 223 that supports the monitor 214 in close proximity to the item indexing conveyor 52 and a light curtain 218 that triggers operation of the item indexing conveyor 52.

In an embodiment shown in FIG. 6a, the indexing cycle indicator 200 provides at least two signals for indicating a stage of the item indexing conveyor 52. The indexing cycle indicator 200 may include a light indicator that changes color to indicate, to an operator, in which stage or mode the indexing conveyor 52 is operating. For example, a red light may be used to indicate that the item indexing conveyor 52 is in an indexing cycling mode or advancing and that items are not introducible into the IPM assembly 10. A yellow light may be used to indicate that the indexing cycling mode is ending within a predetermined period. A green light may be used to indicate that the item indexing conveyor 52 is in a loading mode or paused and that items may be introduced into the IPM assembly 10. In an embodiment, the light indicator of the indexing cycle indicator 200 may be a continuous, pulsed, and/or staccato light. The indexing cycle indicator 200 is communicatively coupled to the processing system 15 and supported on the processing system 15 adjacent the monitor 214, and an operator is able to observe the indexing cycle indicator 200 and the monitor 214 approximately simultaneously and while imaging and introducing each item 12 into the IPM assembly 10. As used herein, it is foreseeable that an operator may be a robotic tool, or another technology known in the art, that is able to perform tasks without human intervention.

Figure 6B:
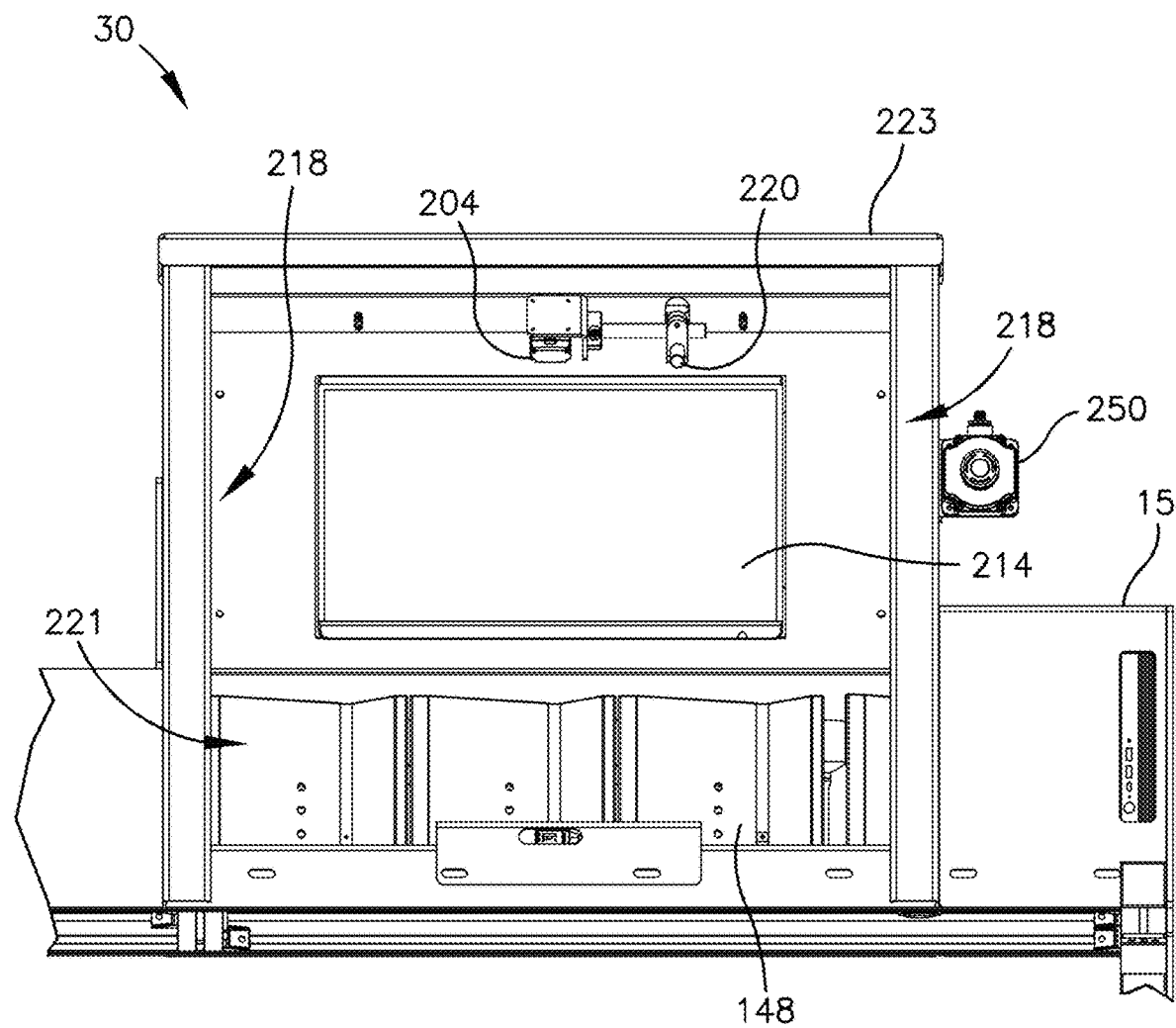

In an embodiment shown in FIG. 6b, the light curtain 218 is used instead of the indexing cycle indicator 200, and the light curtain 218 triggers operation of the item indexing conveyor 52, including advancement of the item indexing conveyor 52 and pausing the advancement of the item indexing conveyor 52. The light curtain 218 includes a transmitter that emits a plurality of light beams and receiver that detects the light beams. Interruption of the light beams by an operator triggers the item indexing conveyor 52 to pause, which enables the operator to place the item 12 onto the item indexing conveyor 52. Uninterruptedness or continuity of the light enables the item indexing conveyor 52 to advance the item indexing conveyor 52 and the items 12 contained therein. It is foreseeable that an autonomous robot may be used to place each item 12 onto the item indexing conveyor 52.

In an embodiment shown in FIG. 2, induction commences when the identification tag reader 14 coupled to a bottom of a frame of the item indexing conveyor 52 and directed toward and within read range of the identification tag 13 on the tote 11 when the tote 11 is conveyed into alignment with or right before an opening 221 in the conveyor housing 55 activates the identification tag reader 14. After the identification tag 13 is read by the identification tag reader 14, an item identification indicia or a product identification label (i.e. a barcode) 222 on each item 12 in the tote 11 is imaged by the optical imaging device 204 just prior to the item 12 being placed on the item indexing conveyor 52. In an embodiment, the optical imaging device 204 images or captures the barcode 222 of item 12 as the operator removes the item 12 from the tote 11. The optical imaging device 204 is communicatively coupled to the processing system 15, which identifies the item 12 by comparing the barcode 222 of the item 12 to the item identification information of the order information. The order information includes an orientation that the item 12 is to be positioned relative to the V-shaped block 148, and a signal or prompt is provided by the processing system 15 for the operator detailing the orientation of the item 12. In an embodiment, the prompt is an operator visual aid ("OVA") shown via the monitor 214, and the OVA includes a barcode loading orientation information view, such as one of the views shown in FIGS. 5a-5g, that details a direction that the barcode 222 on the item 12 is to be directed relative to the retaining notch 178 of the V-shaped block 148 when the item 12 is placed therein. The OVA may also include other product information or a product image for verification of the item 12 by the operator.

Each item is placed on the item indexing conveyor 52 through the opening 221 in the item indexing conveyor housing 55. In an embodiment shown in FIG. 6a, the monitor 214, which may be a touchscreen monitor, is positioned above the opening 221 to facilitate viewing the barcode loading orientation information and placing the item 12 on the item indexing conveyor 52. In an embodiment shown in FIG. 6b, the item induction housing 223 supports the monitor 214 adjacent to the item indexing conveyor 52 that extends through the item induction housing 223 to facilitate imaging the item 12 with the optical imaging device 204, viewing the barcode loading orientation information, and placing the item in the retaining notch 178 of the V-shaped block 148 on the item indexing conveyor 52. The operator is able to view the monitor 214 and the V-shaped block 148 approximately simultaneously or with minimal movement or rotation of the operator's head. In an embodiment, the item induction housing 223 is positioned over the item indexing conveyor 52 and at a first end 154 thereof and supports the monitor 214 adjacent the rear side 164 conveyor housing 55 such that an operator views the monitor 214 by looking over and across the item indexing conveyor 52.

Figure 5A:
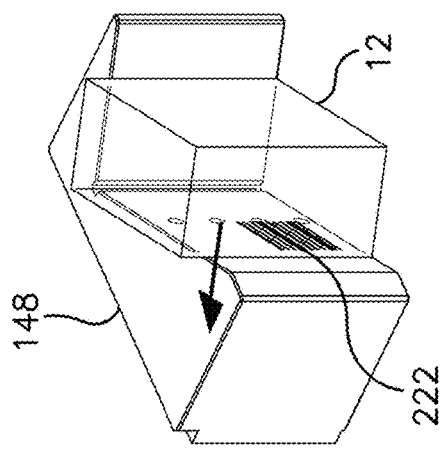
FIGS. 5a-5g show views of an item with a barcode positioned relative to a retaining notch of the V-shaped block of FIG. 4 with arrows indicating a direction that a side of the item with the barcode is facing, similar to an operator visual aid that might be shown on a monitor to indicate the direction that the barcode on the item is to face when the item is introduced into the IPM assembly.
Figure 5B:
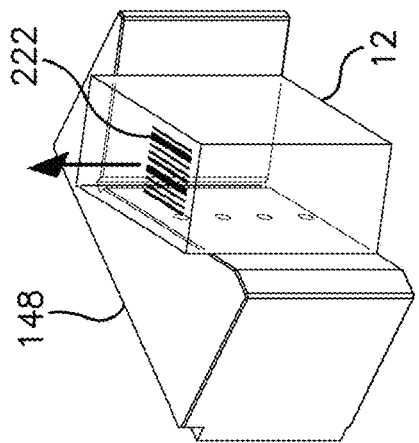
Figure 5C:
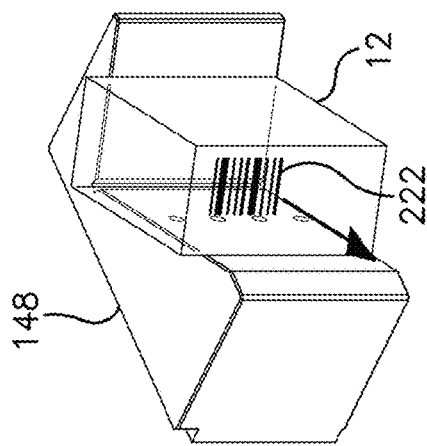
Figure 5D:
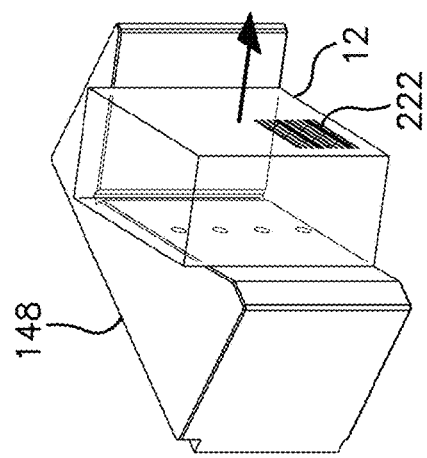
Figure 5E:
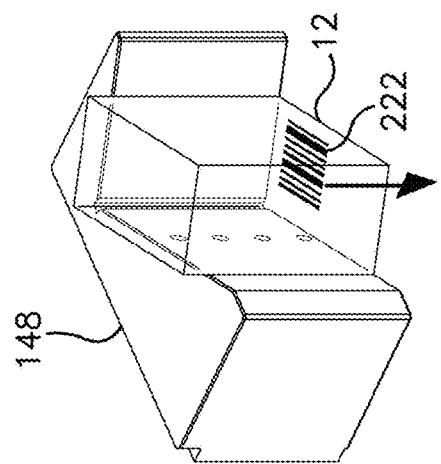
Figure 5F:
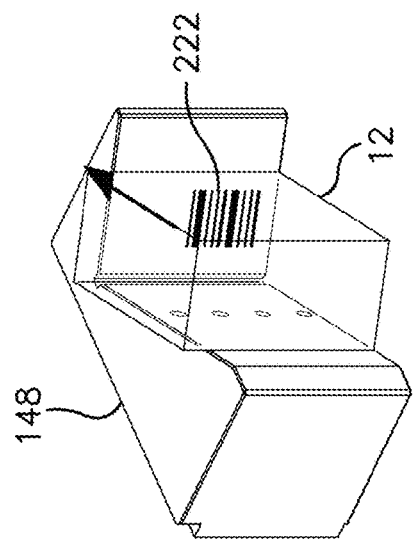
Figure 5G:
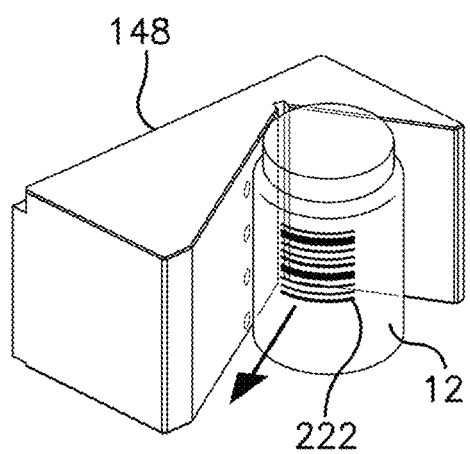

As shown in FIGS. 5a-5f, a six-sided polygonal item 12 may be loaded into the retaining notch 178 of one of the plurality of V-shaped blocks 148 in one of six different orientations: FIG. 5a shows the item 12 loaded with the barcode 222 directed toward the drop surface 192; FIG. 5b show the item 12 loaded with the barcode 222 directed upward; FIG. 5c shows the item 12 loaded with the barcode 222 directed away from the pushing surface 194; FIG. 5d shows the item 12 loaded with the barcode 222 directed away from the drop surface 192; FIG. 5e shows the item 12 loaded with the barcode 222 directed downward; and FIG. 5f shows the item 12 loaded with the barcode 222 directed toward the pushing surface 194. FIG. 5g shows an item 12 that is a cylindrical container with the barcode 222 directed away from the pushing surface 194, similar to the polygonal item 12 shown in FIG. 5c. In an embodiment items of other shapes may be loaded into a V-shaped block 148, and the OVA will display the barcode loading orientation information of the item 12 relative to the V-shaped block 148 as each item is inducted into the item induction assembly 30.

The sensor 220 is a beam sensor that is positioned to detect at least a presence of the item 12 placed onto the item indexing conveyor 52, verifying that the item 12 is being processed in the IPM assembly 10. In an embodiment shown in FIG. 6a, the sensor 220 is secured to a sensor support 224 that is coupled to a frame of the item indexing conveyor 52 and extends therefrom such that the sensor 220 is positioned above the item 12 that is placed in the retaining notch 178 of a V-shaped block 148 positioned to receive the item 12. As best shown in FIG. 6a, a sensing path or beam 230 of the sensor 220 is directed along or adjacent to the drop surface 192 of the V-shaped block 148 to detect the item 12 and verify placement of the item 12 in the item indexing conveyor 52. The sensor 220 is communicatively coupled to the processing system 15, and a position of the item 12 is indexed or associated with a V-shaped block 148 upon placement of the item 12 in the item indexing conveyor 52. Upon induction and verification of the item 12 into the item induction assembly 30, the processing system or director 15 communicates labeling information to the label applicator assembly 40, packaging information to the packaging assembly 50, and queue or indexing information of the item 12 to the label applicator assembly 40 and the packaging assembly 50.

In an embodiment shown in FIG. 6a, the opening 221 of the conveyor housing 55 may include an opto-electronic or presence detection device 240 that is able to detect a presence of an object or user and is connected to a safety relay device that is enabled to remove motive power from the item indexing conveyor 52 when an object is detected. The opto-electronic device 240 includes a transmitter and a receiver, one of which is positioned above the opening 221 and another of which is positioned below the opening 221. In an embodiment, the opto-electronic or presence detection device 240 is selectively operable to function during the indexing cycling mode. When an object is sensed between the transmitter and receiver of the presence detection device 240, advancement of the V-shaped blocks 148 of the item indexing conveyor 52 is stopped or paused and prevented from moving until the object is removed. Presence detection devices 240 are commonly used safety devices known by those skilled in the art.

In an embodiment shown in FIG. 6b, a stop device 250 is coupled to the item indexing conveyor 52 to stop or pause advancement of the item indexing conveyor 52, which may be utilized if the light curtain 218 fails to trigger the item indexing conveyor 52 to stop advancement. The stop device 250 may be a switching device or another safety device known in the art.

Figure 9:
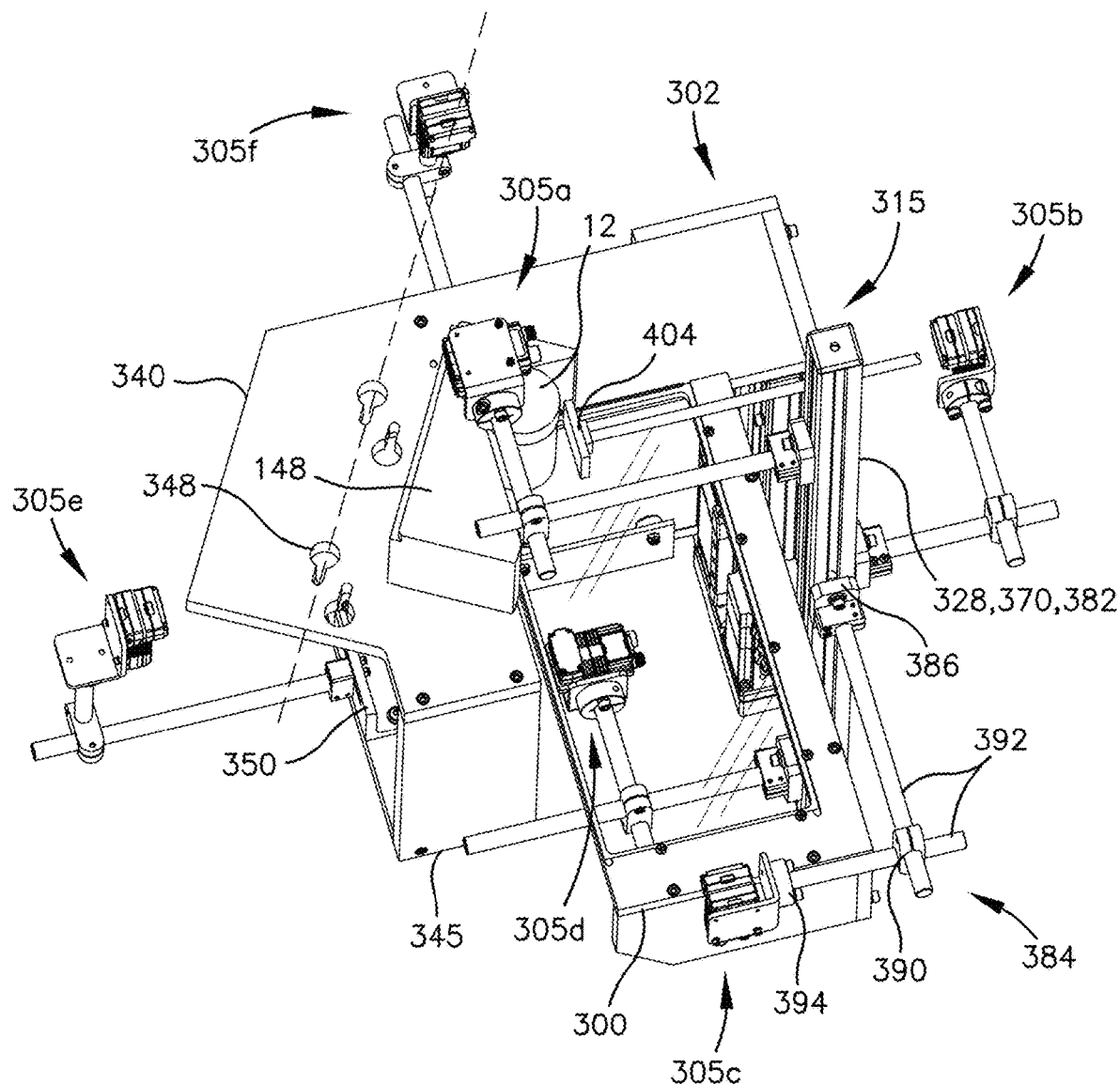
FIG. 9 shows a perspective view from above of a set of cameras positioned relative to an item retained in the retaining notch of the V-shaped block and on the lowerator platform of an embodiment of the label applicator assembly shown in FIGS. 1a and b, and a tamp of the label applicator is positioned proximate to the item.
Figure 10A:
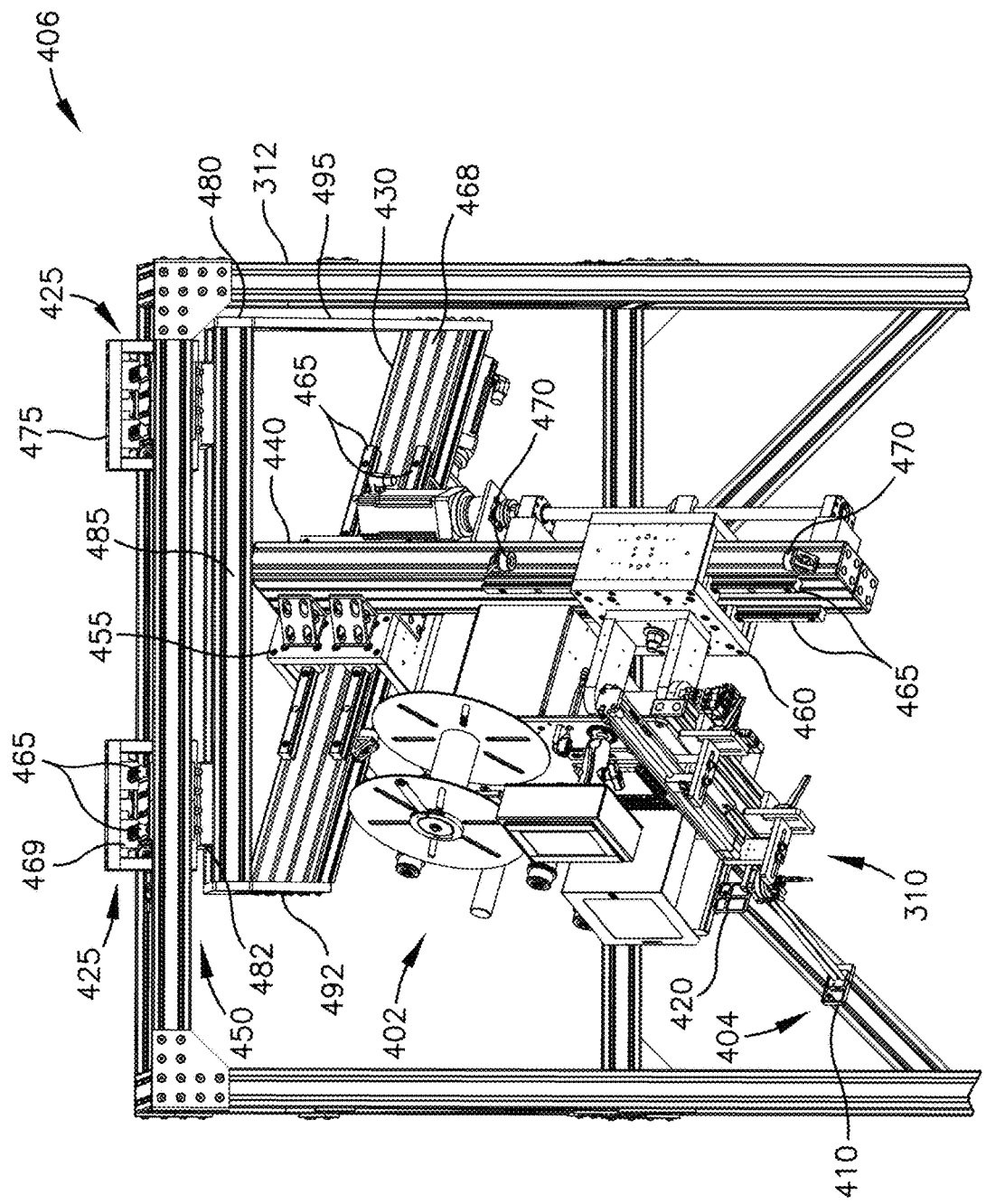
FIGS. 10a and 10b show perspective views of an embodiment of the superstructure shown in FIG. 1a and an embodiment of the mini-structure shown in FIG. 1b, respectively, moveably supporting the label applicator therein.
Figure 10B:
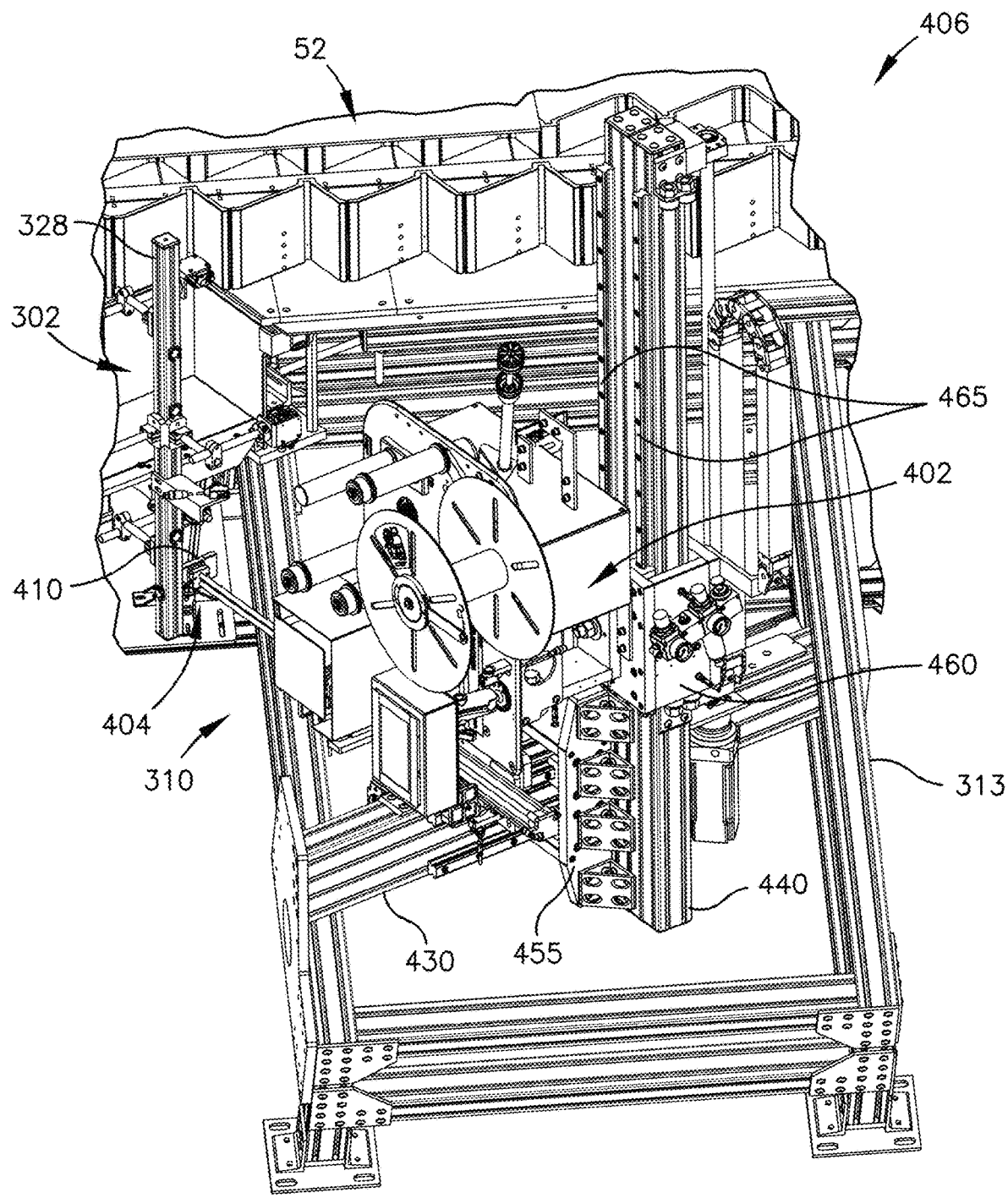

Referring to FIGS. 7-10b, the label applicator assembly 40 includes: a lowerator platform or item receiver platform 300 that is moveably supported by a lowerator housing or item receiver housing 302 and moveable relative to the base 100 of the item indexing conveyor 52 or a first or upper position (shown in FIG. 7) to a second or lowered position (FIG. 8); a set of cameras 305a-305f (FIG. 9) that forms an imaging station; and a label applicator 310 moveably supported in a superstructure 312 (FIG. 10a) or in a ministructure 313 (FIG. 10b). The labeling information received via the processing system 15 may include a patient-specific information print file that includes customer identifying indicia and patient-specific information that is to be applied to the item 12, which may also be referred to as customer information, label application location information indicating a location of where the patient-specific information is to be applied relative to a surface of the item, and label position information indicating a labeling position of the lowerator platform 300 relative to the base 100 where the patient-specific information is to be applied to the item 12. In an embodiment, the labeling position is a position of the lowerator platform 300 where verification and/or application of the label 45 occurs and may be in the first position or the second position. In an embodiment, the label applicator assembly 40 receives the labeling information for each item 12 and temporarily stores the labeling information for the item 12 until a previous item is advanced from the label applicator assembly 40, and the label 45 is printed simultaneously or just before the item 12 is positioned on the lowerator platform 300.

Each of the plurality of V-shaped blocks 148 of the item indexing conveyor 52 sequentially advances adjacent to the lowerator platform 300. As shown in an embodiment in FIGS. 7-9, the base 100 of the item indexing conveyor 52 includes an opening 149 extending therethrough sized to correspond to at least the lowerator platform 300. As the plurality of V-shaped blocks 148 are advanced around the edge mounted conveyor 110, each retaining notch 178 of the plurality of V-shaped blocks 148 is conveyed into alignment with the lowerator platform 300 positioned in the upper position in the lowerator housing 302 and in the opening 149 of the base 100. In the upper position, the lowerator platform 300 is approximately aligned with the base 100 of the item indexing conveyor 52, and when the V-shaped block 148 is conveyed into alignment with the lowerator platform 300, an item 12 retained in the retaining notch 178 of the V-shaped block 148 is advanced onto the lowerator platform 300.

Upon arrival on the lowerator platform 300 of the label applicator assembly 40, the item 12 is verified. Verification of the item 12 may require imaging of one or more of the surfaces of the item 12, and preferably includes imaging at least the surface with the barcode 222 of the item 12. In an embodiment, at least one camera of the set of cameras 305a-305f is used to image the barcode 222 of the item 12. The barcode 222 of the item 12 is compared to at least one of: the item identification information of the order information to verify that the item 12 is the same as an ordered item of the order, an expected item in the indexed position, and/or the item 12 identified on the printed label 45. If the item 12 is verified, the label 45 is applied to the item 12. If the item 12 is not verified, the item 12 is rejected and the label 45 is not applied to the item 12, as described herein.

In an embodiment, upon arrival of the item 12 on the lowerator platform 300 at least one camera of the set of cameras 305a-305f captures images of one or more surfaces of the item 12 prior to application of the label 45 on the item 12. The at least one image may be used in a pharmaceutical verification and compared to at least a third party or pre-existing image that corresponds to the item identification information of the order information.

In an embodiment, a platform elevator 315 functions to move the lowerator platform 300 within the lowerator housing 302. The lowerator platform 300 is mounted on a platform frame structure 318 that extends from a bottom surface of the lowerator platform 300. The platform elevator 315 includes a carriage 320 coupled to the platform frame structure 318, a rail 322 that provides a track or channel 324 in which the carriage 320 is movably secured, a drive assembly that is actuatable to move the lowerator platform 300 from the upper position to the lowered position and then return the lowerator platform 300 to the upper position, and a platform elevator support member 325.

In an embodiment, each item 12 received on the lowerator platform 300 is verified and/or imaged prior to labeling of the item 12, as described herein. The initial verification and imaging at the label applicator assembly 40 may occur when the lowerator platform 300 is in the upper position or in the lowered position. Preferably, verification and imaging occurs in the same position as the application of the label 45 to the item 12 and/or post-labeling imaging. When the lowerator platform 300 is in the upper position, cameras 305a-305d are in an upper position and are able to read or image one or more of the surfaces of the item 12 directed toward the cameras 305a-305d, including the surface with the barcode 222 as shown in FIGS. 5b-5e. Alternatively, when the lowerator platform 300 is in the lowered position, cameras 305a-305d are in a lowered position and cameras 305a-305f are able to read or image one or more of the surfaces of the item 12 directed toward the cameras 305a-305f including the surface with the barcode 222 as shown in FIGS. 5a-5f. In the lowered position, cameras 305e and 305f are able to read or image the respective surfaces of the item 12 shown with a barcode 222 in FIGS. 5a and 5f, which are not able to be imaged when the lowerator platform 300 is in the upper position.

Cameras 305a-305d are secured to a camera elevator 328 that positions the cameras 305a-305d in the upper position or in the lowered position corresponding to the position of the lowerator platform 300. Cameras 305e and 305f are fixed to the lowerator housing 302 and are stationary. Each of the cameras 305a-305f is directed toward one surface or side of the item 12 on the lowerator platform 300. When the lowerator platform 300 is in an upper position, the cameras 305a-305d are in an upper position: camera 305a is directed toward and images an upper surface of the item 12; camera 305b is directed toward and images a surface of the item 12 that is directed away from the drop surface 192; camera 305c is directed toward and images a surface of the item 12 that is directed away from the pushing surface 194; and camera 305d is directed toward a bottom surface of the item 12 and images the bottom surface through the lowerator platform 300. Cameras 305a-305d are lowered to a lowered position when the lowerator platform 300 is lowered and image the respective surface of the item 12 as described relative to the upper position. Cameras 305e and 305f image respective surfaces of the item 12 when the lowerator platform 300 is in the lowered position. Specifically, camera 305e is directed toward a surface of the item 12 that was directed toward the drop surface 192 in the upper position and images the surface through a first housing wall 330 (see FIG. 8) of the lowerator housing 302; and camera 305f is directed toward a surface of the item 12 that was directed toward the pushing surface 194 in the upper position and images the surface through a second housing wall 335 (see FIG. 8) of the lowerator housing 302.

At least a portion of the lowerator platform 300, the first housing wall 330, and the second housing wall 335 are configured such that the respective cameras 305d, 305e, and 305f are able to image the respective surface of the item. Preferably, the lowerator platform 300, the first housing wall 330, and the second housing wall 335 are transparent and formed from a material, such as, for example, a glass, an acrylic, a polycarbonate, another transparent material known in the art, or a combination of such materials.

The lowerator housing 302 comprises a base 340 having a lower surface to which a housing frame 345 is secured. An upper surface of the base 340 of the lowerator housing 302 is configured to be secured to a bottom surface of the indexing conveyor 52. As shown in FIG. 9, a plurality of securing holes 348 extend into the upper surface of the base 340 for securing the lowerator housing 302 to the item indexing conveyor 52 such that the lowerator platform 300 is in planar alignment with the base 100.

The housing frame 345 of the lowerator housing 302 extends below the base 340 and supports mounts 350 to which the cameras 305e and 305f are mounted or secured. The housing walls 330 and 335 also extend below the base 340 and are supported by the housing frame 345. The lowerator platform 300 moves relative to the housing walls 330 and 335, and the housing walls 330 and 335 extend between the base 340 and the lowerator platform 300 when the lowerator platform 300 is in the lowered position such that the surface of the item 12 that was directed toward the drop surface 192 in the upper position and the surface of the item 12 that was directed toward the pushing surface 194 in the upper position are viewable through the respective housing wall 330 and 335 and imageable by the respective camera 305e and 305f. The lowerator housing 302 may be supported by one or more support legs 352 secured to the superstructure 312 and/or the mini-structure 313.

The camera elevator 328 that supports cameras 305a-305d includes a rail 370 that provides at least one track or channel 382 for adjustably mounting each of the cameras 305a-305d thereto. The camera elevator 328 is vertically moveable with the lowerator platform 300 and functions to move the cameras 305a-305d with the lowerator platform 300 as the lowerator platform 300 is moved to the upper position and the lowered position. In an embodiment, the camera elevator 328 is secured to the housing frame 345 of the lowerator platform 300 or to another portion of the lowerator platform 300. It is foreseeable that the camera elevator 328 may be coupled to the platform elevator 315. It is contemplated that the camera elevator 328 may be vertically moveable independent of the lowerator platform 300.

In the embodiment shown in FIG. 9, the rail 370 has at least one channel 382 formed on at least three of the sides thereof, and each of the cameras 305a-305d is securely mounted to the rail 370 in one of the channels 382 by a mounting system 384 that includes a mounting base 386 that is adjustably securable in the channel 382 and one or more two-way connectors 390 adjustably securable to one or more rods 392 that extend between the mounting base 386 and a camera bracket 394 secured to one of the cameras 305a-305d. The mounting base 386 is vertically adjustable relative to the channel 382 to adjust a vertical position of the cameras 305a-305d. The one or more two-way connectors 390 provide adjustability of a distance of each camera 305a-305d from the mounting base 386 and rotational adjustability to further adjust a position or an orientation of each camera 305a-305d. In an embodiment, each of the cameras 305a-305d are independently moveable relative to the camera elevator 328.

After the item 12 is verified, a label 45 may be applied to the item 12 while the lowerator platform 300 is in one of the upper or the lowered position as indicated by the processing system 15. The label applicator 310 is supported by the superstructure 312 (see FIG. 10a) or mini-structure 313 (see FIG. 10b) and communicatively connected to the processing system 15. As described herein, the labeling information sent from the processing system 15 may include a patient-specific information print file such that a label 45 is printed in the label applicator assembly 40 for the item 12, label application location information instructions for positioning the label 45 relative to a surface of the item 12, and label position information that includes whether application of the label and subsequent verification occur with the lowerator platform 300 in the upper position or in the lowered position. The label applicator 310 is configured such that the patient-specific information from the processing system 15 is printed on a label 45 and ready for application when the corresponding indexed item 12 is on the lowerator platform 300 in the labeling position.

As shown in FIGS. 10a and 10b, the label applicator 310 includes a printer assembly 402 that prints a label 45 with patient-specific information corresponding to an indexed item 12 and a tamp or label applicator head 404 that applies the printed label 45 to the item 12. A motion control assembly 406 adjustably positions the tamp 404 relative to the item, adjustably moving the label applicator 310 to position the tamp 404 such that the printed label 45 is applied to a surface of the item 12 in a location on the item as communicated by the processing system 15, preferably avoiding identification labels or barcodes, a national drug code, a stock-keeping unit barcode, an expiration date, or other identifying information known in the art. A contact surface 410 of the tamp 404 extends approximately parallel to the drop surface 192 of the V-shaped block 148 when the lowerator platform 300 is in the upper position or extends approximately parallel to the first housing wall 330 when the lowerator platform 300 is in the lowered position.

The printer assembly 402 is known in the art and includes printing technology that is applicable to printing labels 45. In an embodiment, a direct thermal label printer applies heat to a label 45 having a heat-sensitive coating on a first side to print the patient-specific information thereon. A second side of the label 45 has an adhesive coating on at least a portion thereof to maintain the label 45 in a folded configuration and to adhere the label 45 to a corresponding item. The printed labels 45 are advanced from the printer assembly 402 to a transferring or folding mechanism 420 such that the tamp 404 is able to receive the printed label 45 with the adhesive coating facing away from the contact surface 410 of the tamp 404. The folding mechanism 420 is in a label receiving or open position. The folding mechanism 420 is actuated into a closed position to fold the printed label 45 onto the tamp 404, and the folded printed label 45 is adhered by a portion of the adhesive coating and leaves an exposed adhesive area that is appliable to a selected label location on an item 12. In an embodiment, the exposed adhesive area is approximately ⅜-inches along one side of the folded label 45. The folding mechanism 420 is returned to the open position and the tamp 404 is advanced forward with the folded printed label 45 thereon such that at least the exposed adhesive area of the folded label 45 on the contact surface 410 of the tamp 404 engages a surface of the item 12 or the label location that corresponds to the label application location of the label 45 indicated by the processing system 15.

In the superstructure 312 and the mini-structure 313, the positioning of the tamp 404 is movable by the motion control assembly 406 which may include one or more positioning tracks. The positioning tracks may include one or more of: one or more first tracks 425 that moves the tamp 404 closer to or further from the item indexing conveyor 52, a second track 430 that moves the tamp 404 horizontally in a plane that is approximately parallel to the plane of the drop surface 192, and a third track 440 that moves the tamp 404 vertically in a plane that is approximately parallel to the plane of the drop surface 192. The second track 430 is secured to a first carriage assembly 450 that is slidably securable on the one or more first tracks 425, and the third track 440 is secured to a second carriage assembly 455 that is slidably securable on the second track 430. The label applicator 310 is secured to a third carriage assembly 460 that is slidably securable on the third track 440. An embodiment of the superstructure 312 is described herein, but variants of the superstructure 312 would be understood by one skilled in the art to function similarly. For example, the mini-structure 313 is a variant of the superstructure 312 that has been flipped or inverted to minimize a footprint of the label applicator assembly 40 and to facilitate maintenance of the label applicator assembly 40 and functions similarly to the superstructure 312.

In the embodiment of the superstructure 312 shown in FIG. 10a, each of the tracks 425, 430, and 440 includes one or more rails 465 that guide the corresponding carriage assemblies 450, 455, and 460. In the embodiment shown, each track 425, 430, and 440 includes two rails 465 spaced a distance apart that are secured to a beam member 468. The carriage assemblies 450, 455, and 460 are formed with one or more channels 469 that correspond to and receive each of the one or more rails 465 and enable the carriage assemblies 450, 455, and 460 to slide to position the tamp 404. The rails 465 extend a length that corresponds to a potential positioning of the label 45 on the item 12 by the tamp 404. The tracks 425, 430, and 440 each include at least two limiting stops 470 that limit the movement of the corresponding carriage assembly 450, 455, and 460 on the rails 465.

The one or more one or more first tracks 425 are secured across the superstructure 312 and support the label applicator 310, the printer assembly 402, and the motion control assembly 406. The carriage assembly 450 includes one or more channel housings 475 through which the one or more channels 469 in engagement with the one or more rails 465 extend. A support structure 480 is connected to and suspended from the one or more channel housings 475. The support structure 480 includes one or more spacers 482 that are secured to the one or more channel housings 475 and a frame 485 that supports a first support bracket 492 and a second support bracket 495 between which the second track 430 is positioned and secured. The support brackets 492 and 495 are sized such that the second track 430 is positionable at an angle to position the contact surface 410 of the tamp 404 parallel to the drop surface 192 of the V-shaped block 148 aligned with the lowerator platform 300.

In an embodiment, the tamp 404 has a first home position that is spaced a distance of approximately ¼-inch to the left of the pushing surface 194 of the V-shaped block 148 and ¼-inch above the lowerator platform 300 in the upper position, and a second home position that is spaced a distance of approximately ¼-inch to the left of a plane extending through and below the pushing surface 194 of the V-shaped block 148 and ¼-inch above the lowerator platform 300 in the lowered position. The tamp 404 may be adjustably moved relative to the first and second home positions in a horizontal direction and/or in a vertical direction for application of the label 45 with the patient-specific information to the item 12 in the selected location and position. Directional references, such as left, right, above, and below, used in the description of movement of the tamp 404 or the motion control assembly 406 herein are with reference to a direction of the tamp 404 from a viewpoint of a user facing the operations side 150 of the IPM assembly 10 and movement of the tamp 404 in a plane parallel to the drop surface 192 of the V-shaped block 148. Further, as used herein and with regard to the IPM assembly 10, references to horizontal may refer to a plane or axis parallel to the lowerator platform 300 or the base 100 or the conveyor run 114, and references to vertical may refer to a plane or axis parallel to the drop surface 192 of the V-shaped block 148 or a plane perpendicular to at least the conveyor run 114.

As described, the third track 440 enables the tamp 404 to apply the label 45 to the item 12 when the item 12 is on the lowerator platform 300 in the upper position or in the lowered position. The third track 440 also enables the tamp 404 to apply the label 45 in a selected vertical position on a surface of the item that is directed away from the drop surface 192 and directed toward the contact surface 410 of the tamp 404. In an embodiment, a vertical position of the tamp 404 has a vertical range in a plane parallel to the drop surface 192 of the V-shaped block 148 of up to 12 inches. It is foreseeable that the tamp 404 could have a vertical range in a plane parallel to the drop surface 192 of the V-shaped block 148 of up to 24 includes. In an embodiment, the tamp 404 is moveable in the vertical direction up to four inches above or up to eight inches below a horizontal plane extending parallel to the lowerator platform 300 in the upper position and through the first home position.

The second track 430 enables the tamp 404 to apply the label 45 in a selected horizontal position on a surface of the item 12 that is directed away from the drop surface 192 and directed toward the contact surface 410 of the tamp 404. In an embodiment, the horizontal position of the tamp 404 has a lateral or horizontal range in a plane parallel to the lowerator platform 300 of up to 12 inches. In an embodiment, the tamp 404 is moveable in the horizontal direction up to 12 inches to the left of a vertical plane extending through the home position.

As shown in FIGS. 11a-11d, the label 45 applied by the tamp 404 may be applied to items 12 of a variety of different shapes and sizes by varying a horizontal position and/or a vertical position of the tamp 404. For example, to apply a label 45 to a flat or a rectangular prism or box-shaped item 12 with six surfaces, the tamp 404 may be positioned in the home position or another position to the left and/or above the home position that corresponds to a surface of the item. In FIGS. 11b and 11c, rounds or cylindrically-shaped items 12 are shown and the tamp 404 is positioned relative to a dimension of the item for application of the folded printed label 45 onto the item 12. In an embodiment, the tamp 404 is positioned a distance from the pushing surface 194 of the V-shaped block 148 such that the exposed adhesive area of the label 45 on the tamp 404 is applied to the cylindrically-shaped item 12 at approximately a dimension of ½ a distance of the diameter of the item from the pushing surface 194. The location of the label 45 on each item 12 may be varied horizontally and vertically by changing a position the tamp 404, horizontally and vertically, such as, for example, to avoid applying the label 45 onto identifying labels or barcodes of the item, and may include overhanging the label 45 on an edge of the item 12.

Figure 7:
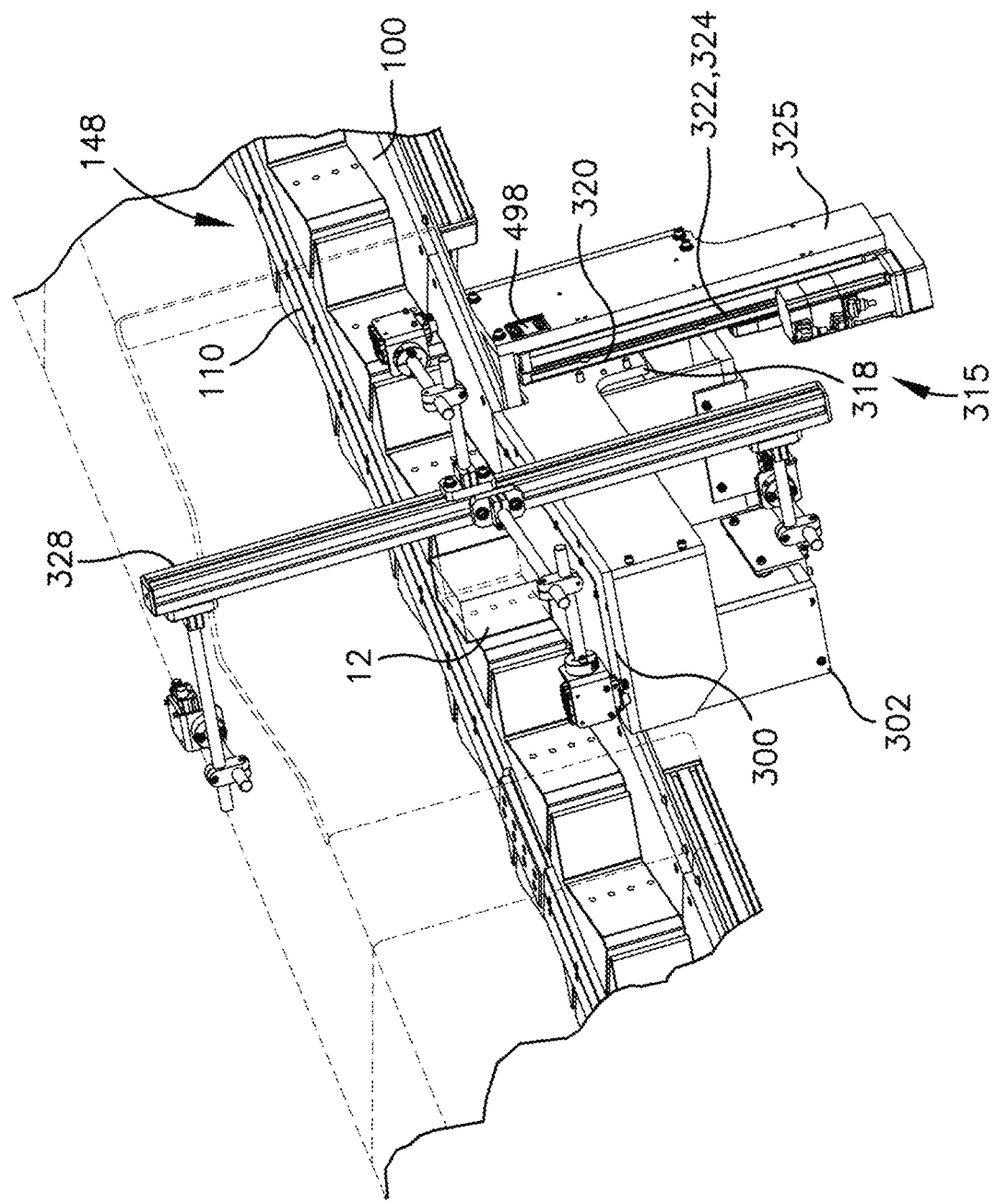
FIG. 7 shows a front and side perspective view of an embodiment of a label applicator assembly of the IPM assembly shown in FIGS. 1a and 1b, including a lowerator platform in an upper position and with a label applicator removed.

As shown in FIG. 7, a tamp pad 498 is positioned on the platform elevator support member 325 for instances in which the label 45 is not appliable to the item 12. For example, such instances may include when the item 12 on the lowerator platform 300 or upon arrival at the label applicator assembly 40 is not verified as described herein and does not match the label 45. In such a case, the item 12 becomes an exception and the label 45 is not applied to the item 12. The label applicator 310 may be manually or automatically paused or put in a stop state or mode, and the label 45 may be manually removed from the label applicator 310 by an operator or the tamp 404 may be lowered or raised to and aligned with the tamp pad 498 such that the label 45 is appliable to the tamp pad 498. The item 12 may be thereafter advanced through the packaging assembly 50 to a station for manual labeling.

After the folded, printed label 45 is applied to each item 12, the item 12 is imaged by at least camera 305b that is directed toward and captures an image of the surface of the item 12 with the applied label 45. In an embodiment, an image of the surface of the item 12 with the barcode 222 is simultaneously imaged. The images captured after the item 12 is labeled may be referred to as verification images, and in an embodiment the verification images are captured with the lowerator platform 300 in the same position as where the label 45 was applied to the item 12. One or more of the cameras 305a-f may capture one or more images of one or more of the surfaces of the item 12.

Figure 15:
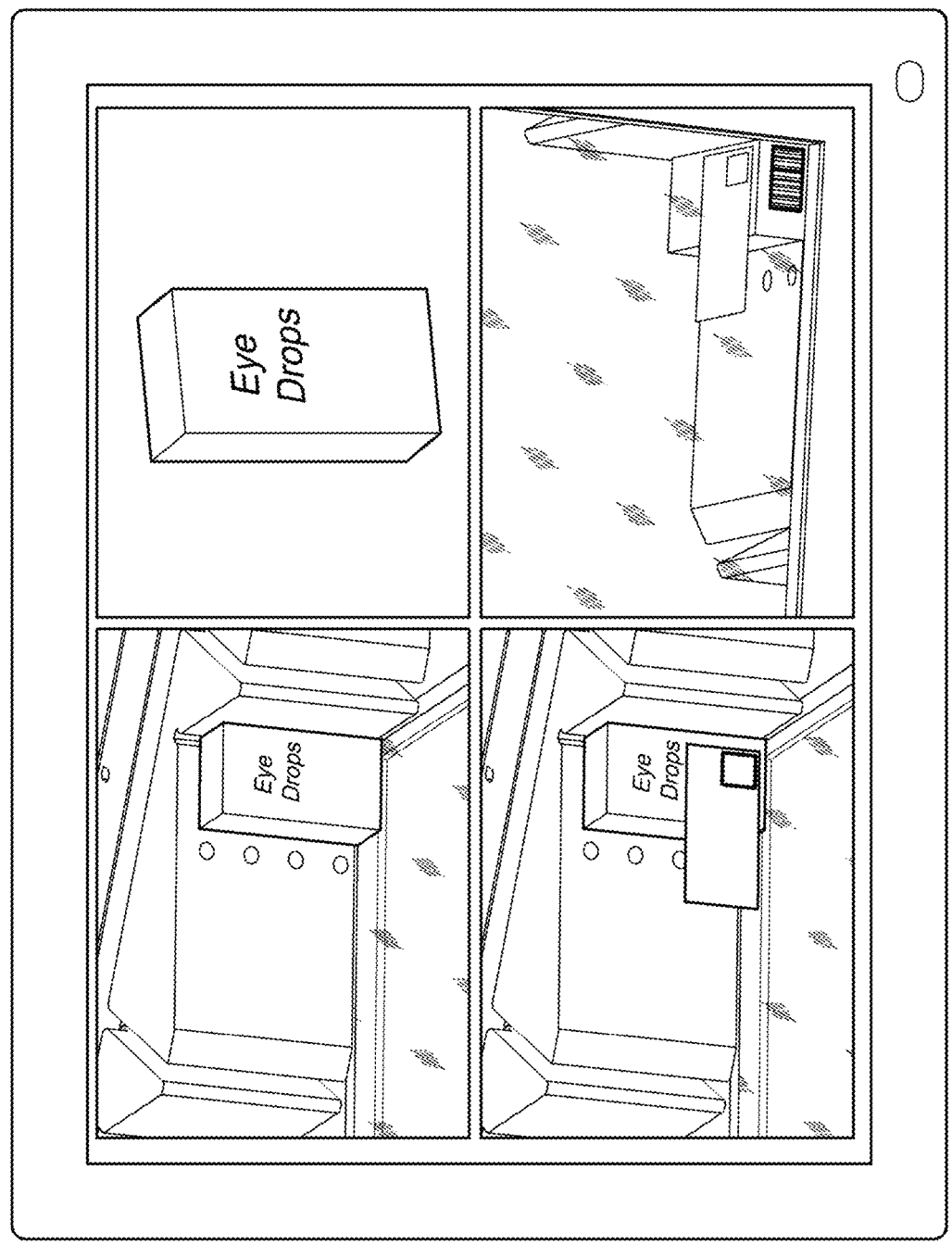
FIG. 15 shows a schematic view of a predetermined set of images of the item to verify the item in a pharmaceutical verification process.

In an embodiment, a pharmaceutical verification process is performed between capturing the verification images with the label 45 applied to the item 12 and the item 12 arriving at an item verification station of the packaging assembly 50. A pharmaceutical verification process comprises creating a file that includes a predetermined set of images 499 of the item 12 that are captured in the label applicator assembly 40 and compared by an operator or pharmacist to verify the item 12 that was labeled therein corresponds to the item identification information of the ordered item in the order information. The images used for verification may include one or more images of one or more of the surfaces or sides of the item 12, including the image with the label 45 applied to the item 12 and the image of the barcode 222 on the item 12. Verification may occur by an operator or pharmacist that is on-site or at a remote site. In an embodiment, the operator receives the set of images 499 captured in the label applicator assembly 40 and the order information on a monitor or personal computing device, compares the set of images 499 and the order information, and confirms or excepts the labeled item 12 using an input device. In an embodiment shown in FIG. 15, the set of images may be arranged together for comparison and includes a captured image of a front or surface of the item 12 in the label applicator assembly 40 and prior to labeling, a third party or pre-existing image that corresponds to the item identification information of the ordered item in the order information, the captured image of the surface of the item 12 with the label 45 applied thereto, and the captured image of the surface of the item 12 with the barcode 222 that is captured simultaneously with the image with the label 45 applied to the item 12. In an embodiment, the label 45 and/or the barcode 222 on the item 12 are highlighted or emphasized and compared during the pharmaceutical verification process to the item identification information. In an embodiment, the set of images 499 are compared by a processing system or automated program, which may utilize software, machine learning, and/or artificial intelligence. In an embodiment, the pharmaceutical verification process may occur after each of the orders is packaged.

The item 12 is advanced from the labeling position of the lowerator platform 300 and toward the packaging assembly 50. If in the lowered position, the lowerator platform 300 with the item 12 supported thereon is moved to the upper position. From the upper position, the item 12 is advanced in its indexed position by the corresponding V-shaped block 148 on the base 100 toward the packaging assembly 50.

Referring to FIG. 12, the packaging assembly 50 includes a verification station 500 that images the label 45 on each item 12 for verification of the item 12, a chute or funnel 505 through which at least one item 12 of an order is advanced into a package 615 having order identification information 510 (see FIG. 13b) applied thereon that corresponds to the order, a document printing station having one or more printers 640 (shown in FIG. 1a) that are able to print and deliver patient information documents associated with the item or items 12 in each order for inclusion in the package, and a conveyor 650 that is able is able to advance a sealed package 615 with the order therein to exit the IPM assembly 10 or reject the package 615 and advance the package 615 to a review conveyor 665 to be reviewed by an operator.

The packaging assembly 50 receives the packaging information from the processing system 15 for each order and for each item 12 in the order. The packaging information may include indexing information for each item 12 in the order, a patient information document print file, if required, for printing the patient information documents in the document printing station, and order identification information for applying to each package.

In an embodiment, the verification station 500 comprises a presence sensor and/or a packaging assembly imaging device 530 secured to a support frame 535 of the item indexing conveyor 52. The packaging assembly imaging device 530 is in alignment with an opening 540 in the conveyor housing 55 to detect when the item 12 is advanced into the verification station 500 and/or to image the item 12 retained in the V-shaped block 148 that is advanced into a position that corresponds to the opening 540. The packaging assembly imaging device 530 is activated to image the label 45 of the item 12 through the opening 540 to compare the label 45 to the item identification information in the order information to verify the item 12.

As shown in FIG. 12, subsequent to the verification station 500 the opening 149 in the base 100 corresponds to the chute 505 coupled to the item indexing conveyor 52. The opening or drop gate zone 149 extends under one or more of the retaining notches 178 of the V-shaped blocks 148, and the opening 149 forms an entrance into the chute 505. A gate 555 is in covering relationship with the opening 149 and in alignment with the base 100 such that the item or items 12 advanced onto the gate 555 are advanced through the opening 149 and into the chute 505 when the gate 555 is rotated into an open position.

One or more presence sensors 550 are positioned to extend in alignment with and over the a position of one or more retaining notches 178 of the V-shaped blocks 148 that cycle or advance over the gate 555. The presence sensors 550 are able to detect a presence of an item 12 retained in the retaining notches 178 advancing over the gate 555. In an embodiment shown in FIG. 12, the opening 149 is sized to correspond to two retaining notches 178, and two presence sensors 550 are aligned thereabove in a position to detect each item 12. Upon detection of at least one item 12 by one of the one or more presence sensors 550, the gate 555 is opened and the one or more items 12 are advanced or dropped into the chute 505. It is foreseeable that the opening 149 and the gate 555 may be sized to correspond to a desired number of retaining notches 178 greater than or less than that shown in FIG. 12.

The sensors 550 are secured to a sensor support 556 that is coupled to a frame of the item indexing conveyor 52 and extends therefrom such that the sensors 550 are positioned above the item or items 12 that are in the retaining notches 178. As shown in FIG. 12, one or more sensing paths or beams 558 of the sensors 550 are directed to detect each item 12. The sensors 550 may be communicatively coupled to the processing system 15.

The processing system 15, in cooperation with the item indexing conveyor 52, indexes a position of consecutive items in adjacent retaining notches 178 that are part of the same order and/or consecutive items in nonadjacent retaining notches 178 that are part of the same order, but without items of another order therebetween, for packaging together. Packaging of more than one item in one package may require more than one cycle or advancement of one or more items through the chute 505. In an embodiment, up to four items in one order may be packaged together. In an embodiment, the number of items packaged together is limited by the size of the package, and a plurality of cycles of advancing one or more items 12 through the chute 505 may be required to fulfill an order.

The frame 535 supports a hinge or pivoting mechanism 560 that pivots or drops the gate 555 down and out of alignment with the base 100. The gate 555 extends between the pivoting mechanism 560 and the V-shaped blocks 148, and the pivoting mechanism 560 may be pneumatically controlled for actuation after at least one item 12 is detected by a presence sensor 550. The gate 555 is configured such that it extends under each retaining notch 178, and downward pivoting of the gate 555 relative to the pivoting mechanism 560 causes items supported thereon to drop into the chute 505.

Figure 13A:
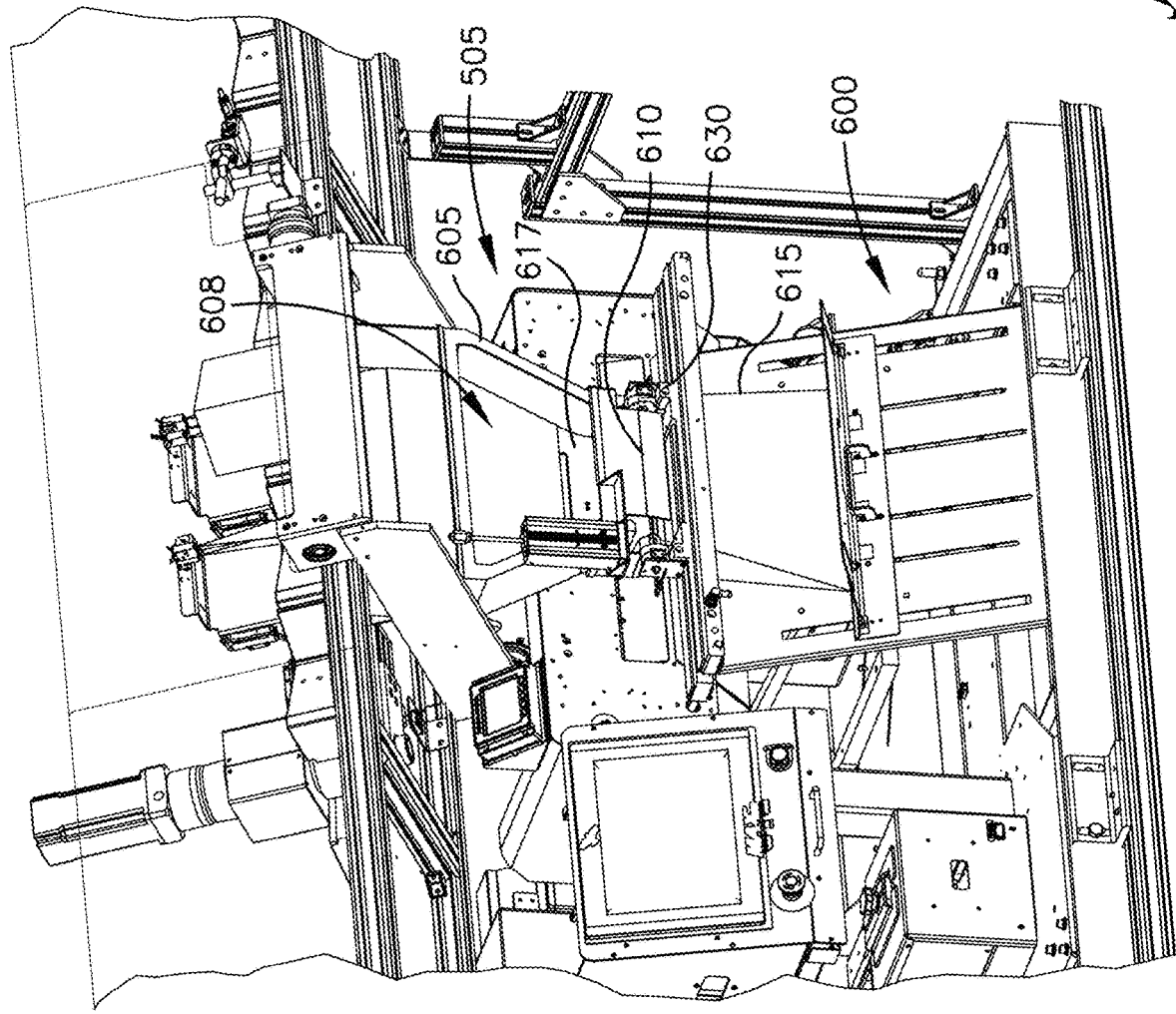
FIGS. 13a and 13b show front perspective views of embodiments of a packaging assembly shown in FIGS. 1a and 1b, respectively.
Figure 13B:
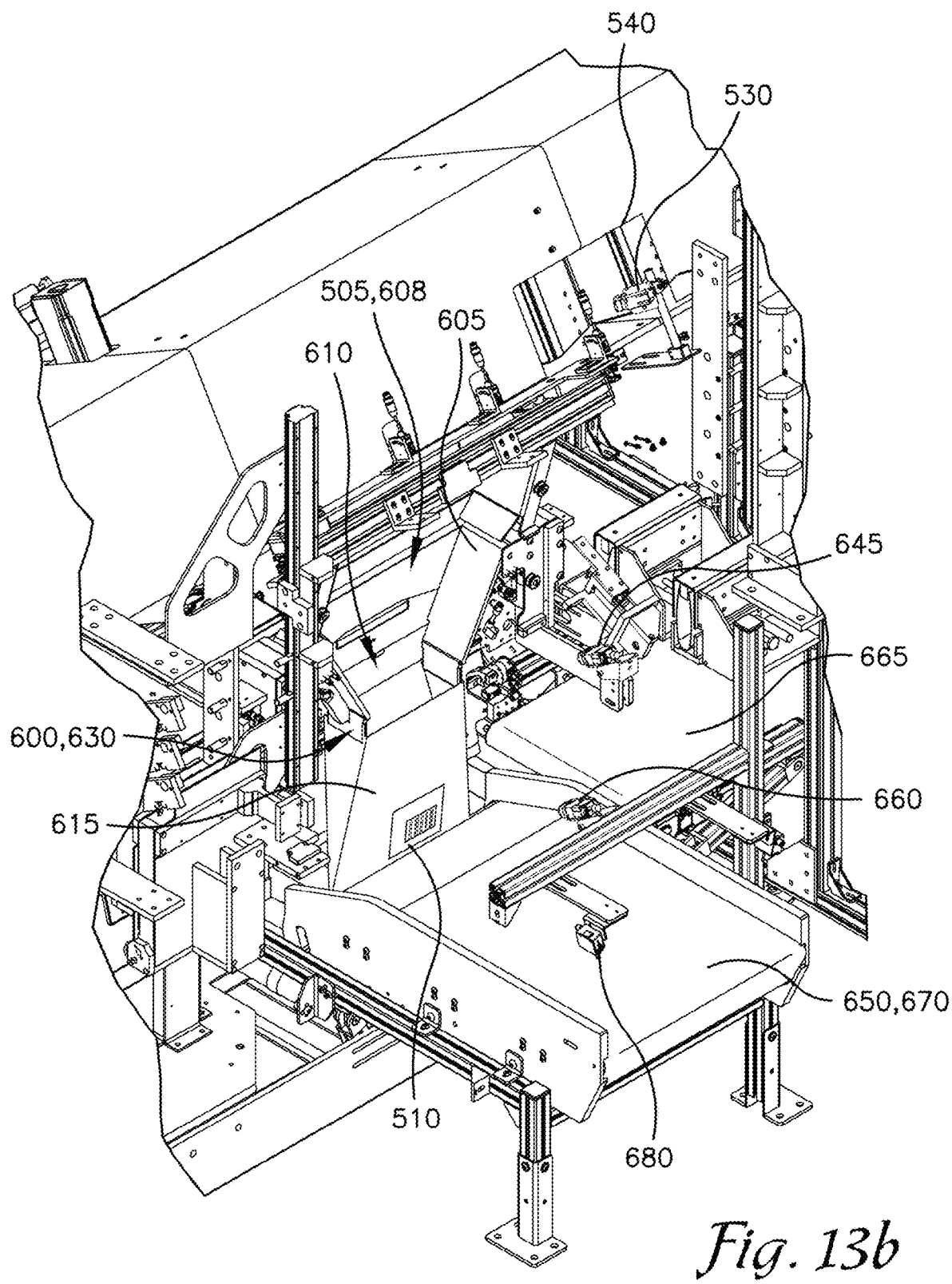

As shown in FIG. 13a, the chute 505 extends between the opening 149 in the base 100 and a bagging assembly 600. The chute 505 is formed in the shape of a funnel, having at least two sides 605 that form a narrowing channel 608. It is foreseeable that the chute 505 may also be formed in another shape that guides the items into a package 615. Items dropping or advancing through the opening 149 are guided or directed through the narrowing channel 608 toward an exit 610 of the chute 505. The exit 610 corresponds to a top of a package 615 that is supported by the bagging assembly 600 and/or a conveyor 650 (see FIG. 13b). Each item 12 is advanced through the chute 505 and falls through the exit 610 and into the package 615 positioned thereunder. In an embodiment, at least one side 617 of the chute 505 is transparent such that a chute imaging device 620 (see FIG. 12), supported on the frame 535 and directed toward the transparent side, is able to detect an item 12 that is jammed or stuck within the chute 505 and fails to fall into a bag or package 615 positioned under the exit 610 of the chute 505.

The bagging assembly 600 is able to apply or print order identification information 510, such as an order identification indicia and delivery information that includes a customer or patient name and an order ship-to address on a package or on a label that is applied to the package, image the order identification indicia on the package with a package verification imaging device 660 to verify that the package corresponds to the order, and after the item or items 12 are advanced into the package 615, place or drop the package 615 onto a conveyor 650 that conveys the package 615 to exit the IPM assembly 10. At least one finger device 630 of the bagging assembly 600 opens at least one side of an opening of the package 615 such that the opening of the package 615 is positioned under the exit 610 of the chute 505

The document printing station includes the one or more printers 640 that may print one or more patient information documents associated with one or more items in each order for inclusion with the order in the package. The patient information documents may include patient package inserts, medication guides, instructions for use, and/or other information which may be required or is useful and known by one skilled in the art. Each page of the patient information documents may include a unique document identification indicia and/or order identification information. The one or more printed patient information documents are transferred by a document transfer assembly from the one or more printers 640 and are positioned for insertion into the package when the package is opened by the at least one finger device 630, before or after the one or more items 12 have been advanced into the package. The document transfer assembly includes a document verification imager 645 that that images the document identification indicia on each of the pages of the patient information documents to verify that each of the documents corresponds the order prior to the patient information documents being transferred into the package. 615. The document transfer assembly may include an auto-fold assembly that folds and inserts the printed patient information documents through a slot that guides the printed patient information documents into the opened package. A blade or device folds and pushes the printed patient information documents into the slot such that the printed patient information documents are advanced into the opened package.

In an embodiment, the conveyor 650 is a bi-directional conveyor, and each package is dropped onto the conveyor 650 such that the order identification indicia on the package faces upward or away from the conveyor 650. The package verification imaging device 660 that images the order identification indicia on the package is communicatively coupled to the processing system 15 that is able to selectively determines if a conveyor run 670 of the conveyor 650 is advanced in a first direction such that the package exits the IPM assembly 10 or if the conveyor run 670 of the conveyor 650 is advanced in a second direction such that the item or items contained in the package are reviewed. If the package 615 is verified, the package 615 is sealed after the one or more verified items 12 and/or the one or more verified patient information documents are advanced therein, and the verified package 615 is dropped onto the conveyor 650 and advanced on in the first direction. Items or orders that were unverifiable or previously excepted or rejected may be advanced in the second direction for review. Imaging device 680 is a package sensor that is able to determine when the package 615 has advanced from the conveyor run 670 of the conveyor 650.

Figure 14A:
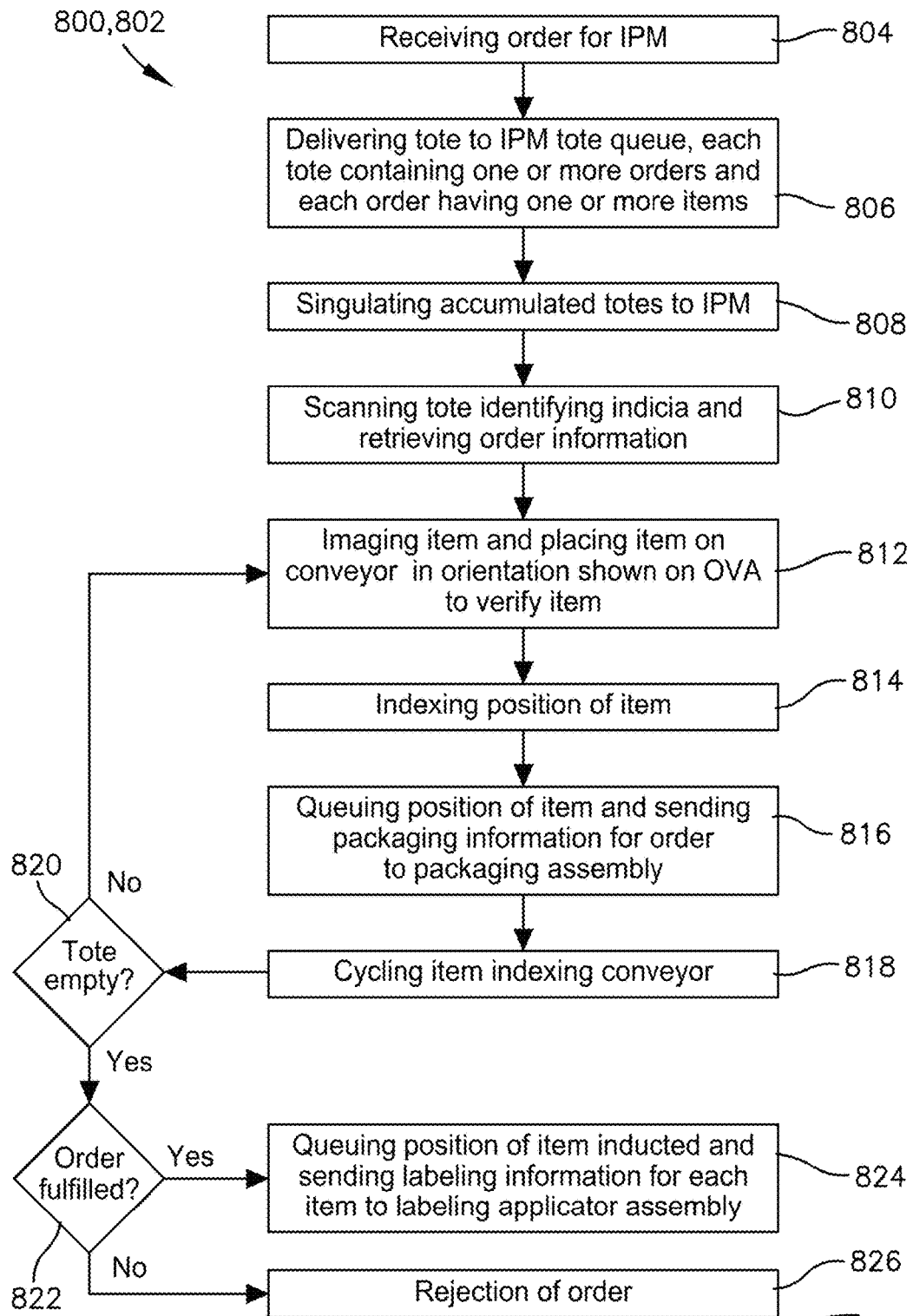
FIGS. 14a-14c are a flow diagrams of an embodiment of an item packaging machine process that is part of an order fulfillment system and includes steps of inducting, labeling, and packaging one or more items using the IPM assembly shown in FIGS. 1a and 1b.
Figure 14B:
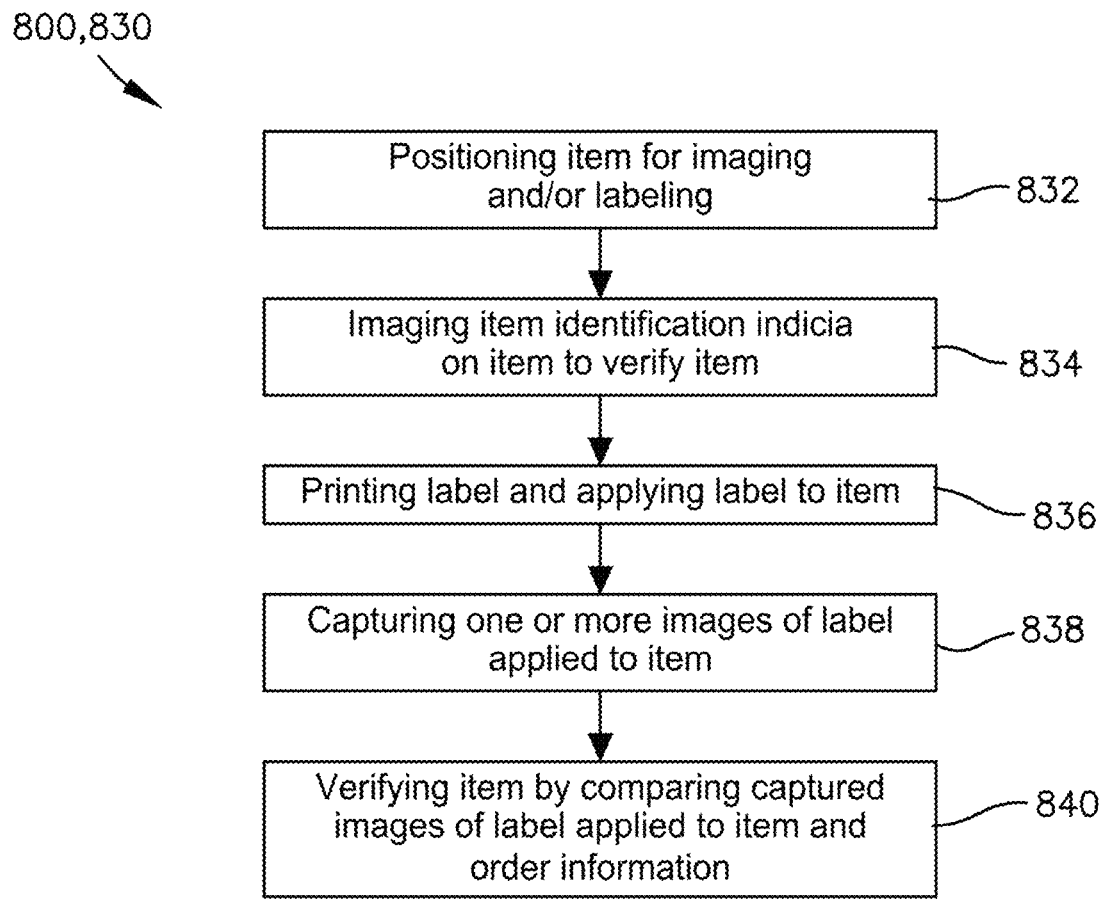
Figure 14C:
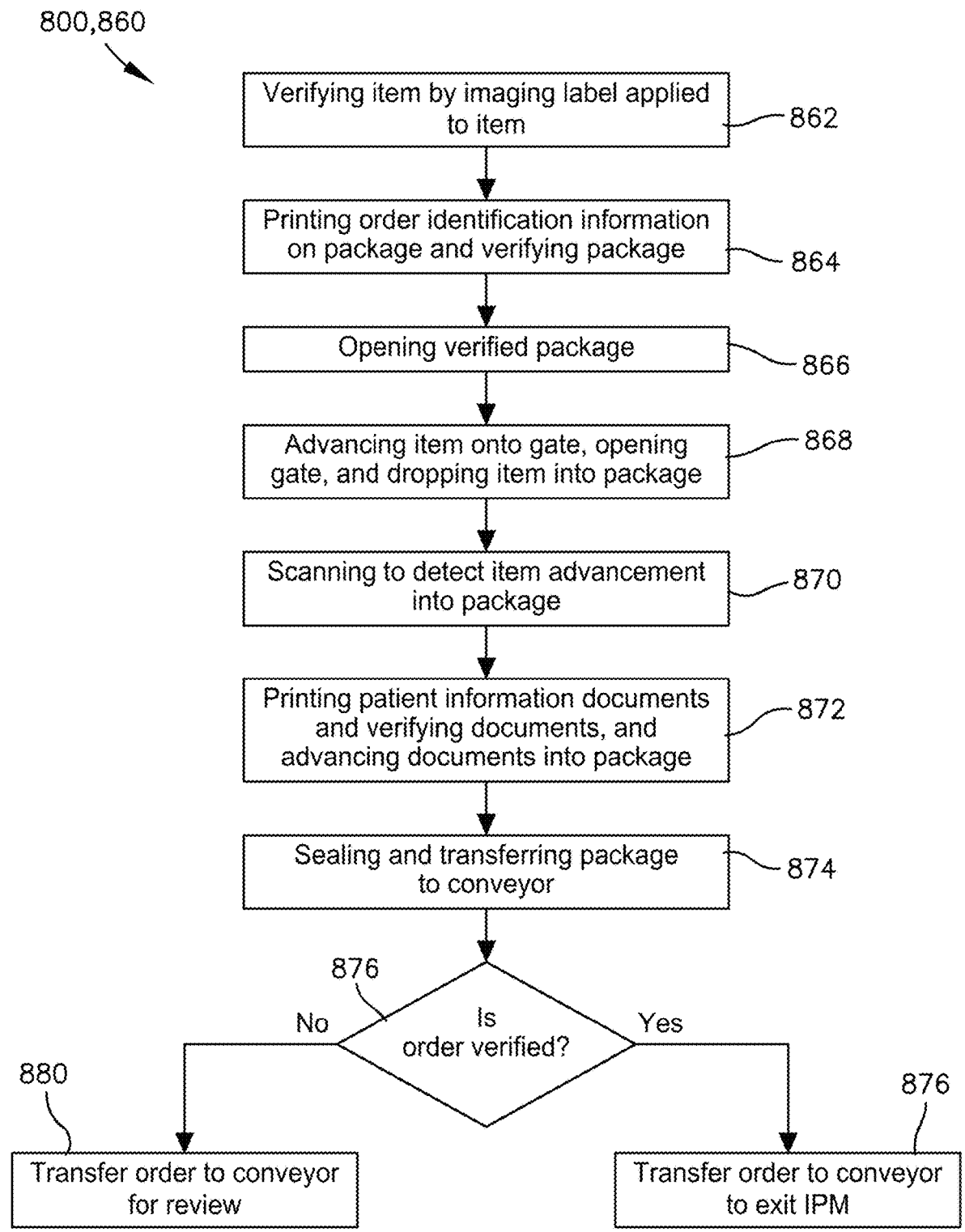

FIGS. 14a, 14b and 14c are flow diagrams of an embodiment of an item packing machine process 800 that is part of an order fulfillment system and includes the steps of inducting, labeling, and packaging items using an embodiment of the IPM assembly 10. The process 800 may also be referred to as a method of fulfilling a plurality of orders in the IPM assembly 10. One or more processing systems or directors 15 that are communicatively coupled to the IPM assembly 10 may be used to execute the process 800 that includes indexing a position of each item 12 on the item index conveyor 52 to facilitate labeling and packaging of the item 12. Other embodiments of the process 800 may be utilized by the IPM assembly 10.

FIG. 14a shows an embodiment of an induction process 802 for inducting and indexing an item into the IPM assembly 10.

At step 804, a customer sends the order and the order information to an order fulfillment operation that includes the IPM assembly 10. The order received by the IPM assembly 10 may include, for example, an order from an e-commerce website, an order from a retail service provider, and/or an order from another foreseeable orderer. The order will trigger the order fulfillment system to begin order fulfillment by picking-and-placing the one or more items 12 of each order into the tote 11.

At step 806, each tote 11, which may contain a multi-item order, a single-item order, or multiple single item orders, is delivered to the IPM tote queue to the IPM assembly 10.

At step 808, the totes 11 are singulated and are advanced to the identification tag reader 14 of the IPM assembly 10.

At step 810, the identification tag 13 on each tote 11 is read by the identification tag reader 14, such as an RFID reader. The identification tag 13 on each tote 11 corresponds to the one or more orders in the tote 11 and the one or more items 12 of each of the orders in the tote 11. The identification tag reader 14 is communicatively coupled to the processing system 15, and the processing system 15 retrieves order information from a database regarding the one or more orders in the tote 11.

At step 812, an operator or item inductor introduces or inducts each item 12 from the order in the tote 11 in succession into the IPM assembly 10 by selecting any one item 12 in the tote 11, imaging the barcode 222 of the item 12 with the optical imaging device 204 for verification of the item 12 of the order, and placing the item 12 onto the V-shaped block 148 to verify the item 12 as directed or specified by the OVA via the monitor 214 via the director 15 that indicates the orientation of the barcode 222 of the item 12 relative to the V-shaped block 148.

At step 814, the item indexing conveyor 52 indexes the position of the item 12 on the item indexing conveyor 52.

At step 816, the director 15 of the IPM assembly 10 queues packaging information to the packaging assembly 50 for each item 12 indexed. Queuing may include sending one or more of the following: indexed position of item 12, and order information that includes the print file associated with the item 12 and/or the order for the document printing station 50. The print file may include order identification information and/or patient information documents for the order.

During the indexing step, induction indicators are reset for each new item 12 introduced into the IPM assembly 10. At step 818, the item indexing conveyor cycles or incrementally advances at least one position as the OVA is reset between each item 12 that is imaged by the optical imaging device 204.

At step 820, the operator or item inductor determines whether one or more items 12 remain in the tote 11 to be inducted into the IPM assembly 10 and indexed on the item indexing conveyor 52. If one or more items 12 remain, the operator repeats the process from step 812, inducting the item 12 into the IPM assembly 10 and repeating the steps until the tote 11 is empty. If no items remain of the order in the tote 11, the tote 11 is advanced to a tote recovery conveyor 22.

At step 822, the director 15 determines whether the one or more orders in the tote 11 have been fulfilled. At step 824, if one or more orders of the tote 11 are fulfilled, the director 15 of the IPM assembly 10 queues an indexed position of the item 12 and labeling information to the label applicator assembly 40 for each item 12 in the one or more orders. At step 826, if an order is not fulfilled but one or more items 12 of the order have been indexed on the item indexing conveyor 52, the order is rejected and any indexed items of the order proceed through the IPM assembly 10 to be manually labeled and verified.

FIG. 14b shows an embodiment of an imaging and verification process 830. In the imaging and verification process 830, a label may be applied to the item 12, and an image of one or more sides of the item 12 is captured. The image of the one or more sides of the item 12 is used for verifying the item 12 in the order.

At step 832, the item 12 arrives at the lowerator platform 300, and the lowerator platform 300 is positioned in a first position with the item 12 in the retaining notch 178 of the V-shaped block 148 or in a second position vertically displaced from the first position.

In an embodiment, at step 834 one or more sides of the item 12 are imaged, including item identification indicia to verify the item 12.

In an embodiment, at step 836 the label 45 is printed with patient-specific information in the printer assembly 402 and applied to the item 12 on the lowerator platform 300 that is in a labeling position. The labeling position of the lowerator platform 300 comprises one of at least the first position and the second position.

At step 838, the one or more sides of the item 12 are imaged, including at least a side of the item 12 that includes the label 45. In an embodiment, the lowerator platform 300 is in the labeling position for the application of the label 45 to the item 12 of step 836, the imaging of the item identification indicia on the item of step 834, and the capturing of the one or more images of the item 12 of step 838.

At step 840, the images of the item 12 are used to verify that the item 12 corresponds to an item in the order. In an embodiment, a third party image of the item 12 is compared to the images of the item 12 for verification. In an embodiment, the barcode 222 is used to verify that the item 12 is an item of the order. In an embodiment, the label 45 is verified. In an embodiment, the images of the item 12 used for verification are compiled in a file and sent to a pharmacist who compares the images with the order information and uses an input device to confirm or approve of the label item 12 or reject or except the labeled item 12, which sends the item to be reviewed. This verification may occur at any time after the labeled item 12 exits the label applicator assembly 40 and prior to being sent to the patient or customer.

FIG. 14c shows an embodiment of a packaging process 860 that includes verifying the item 12, and packaging one or more items 12 of an order in a bag or package.

At step 862, each item 12 arrives at the verification station 500 where the label 45 and on each item 12 is imaged for verification.

For the packaging steps, the package 615 is prepared for each order. At step 864, the bagging assembly 600 prints order identification information onto the package 615 and reads and verifies that the order identification information matches the order to be advanced into the package 615. In an embodiment, a package verification imaging device 660 is communicatively coupled to the processing system 15 and verifies the package.

At step 866, the packaging assembly 50 opens the verified package 615.

At step 868, the item 12 indexes or advances onto the gate 555 that is in covering relationship with the opening or drop gate zone 149, the gate 555 is opened, and the item 12 is dropped through the chute 505 and into the bag or package 615.

In an embodiment, at step 870 the chute imaging device 620 detects if an item is stuck in the chute 505 or verifies that the chute 505 is free of jams or obstructions.

For the document printing steps, the one or more patient information documents are prepared for each order. At step 872, the document printing station prints the patient information documents, including unique document identification indicia on each page of the documents for the order, reads and verifies that the document identification indicia on the documents matches the order, and transfers or advances the documents into the package. In an embodiment, a document verification imaging device is communicatively coupled to the processing system 15 and verifies the patient information documents.

At step 874, the packaging assembly 50 seals the package 615 and drops the package 615 with the order identification information facing upward onto a bidirectional conveyor. The package verification imaging device 660 identifies whether the package containing the one or more items of the order is verified in step 876 and transfers verified packages 615 onto a conveyor to exit the IPM assembly 10 in step 878 or identifies and transfers the one or more items that are unverifiable or previously rejected to a review conveyor for review at step 880.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims.

What is claimed is:

1. An item packaging machine configured to fulfill a plurality of orders, wherein each of the plurality of orders includes one or more items each having an item identifying indicia thereon, the item packaging machine comprising:
    a processing system accessing order information associated with each of the plurality of orders and including order identifying indicia for each of the plurality of orders;
    a conveyor configured to advance the one or more items through the item packaging machine, wherein the conveyor forms a conveyor run on which each of the one or more items are advanced;
    an introduction assembly configured to associate an indexed position of each of the one or more items positioned on the conveyor run with item identifying information for the item at the respective indexed position;
    a label applicator positioned proximate a labeling station on the conveyor run;
    at least one labeling verification camera positioned proximate the label applicator and in communication with the processing system, wherein upon each of the items being advanced to the labeling station, the processing system causes the at least one labeling verification camera to capture the item identifying indicia on the item at the labeling station and if the item identifying indicia captured from the item at the labeling station corresponds to the item identifying indicia associated in the processing system with the item expected at the labeling station based upon the indexed position of the item in the processing system, the processing system causes the label applicator to apply to the item a label with customer identifying indicia associated with the item printed thereon and thereafter the processing system causes the at least one labeling verification camera to capture at least one image of the item wherein the at least one image includes the item identifying indicia and at least a portion of the label including the customer identifying indicia thereon; and
    a packaging verification camera positioned proximate a packaging verification station on the conveyor run proximate a packaging assembly operable to advance the item from the packaging verification station into a package, the packaging verification camera and the packaging assembly in communication with the processing system, the processing system causes the packaging verification camera to capture the item identifying indicia on the item or the customer identifying indicia on the label at the packaging verification station and if the item identifying indicia or the customer identifying indicia captured from the item at the packaging verification station corresponds to the item identifying indicia associated in the processing system with the item expected at the packaging verification station based upon the indexed position of the item in the processing system, the processing system causes the packaging assembly to advance the item into a package and to apply the order identifying information for the order to the package.

2. The item packaging machine of claim 1, wherein the conveyor further comprises a plurality of V-shaped blocks and the indexed position of the item corresponds to one of the plurality of V-shaped blocks.

3. The item packaging machine of claim 1, wherein the introduction assembly comprises an introduction camera that is communicatively coupled to the processing system, wherein the processing system causes the introduction camera to capture an image of the item identifying indicia on each of the items as the item is advanced into one of the indexed positions on the conveyor run to associate the item identifying indicia with the indexed position and to verify the item identifying indicia corresponds to the item identifying indicia of one of the one or more items in the order.

4. The item packaging machine of claim 3, further comprising a display communicatively coupled to the processing system, wherein upon capturing the image of the item identifying indicia of the item by the introduction camera, the display provides a prompt indicating an orientation of the item identifying indicia on the item relative to the conveyor when positioned on the conveyor run.

5. The item packaging machine of claim 1, wherein the at least one labeling verification camera comprises a set of six labeling verification cameras wherein each of the six labeling verification cameras is positioned relative to the labeling station to image a different side of the item.

6. The item packaging machine of claim 1, wherein the label applicator is mounted for movement along at least two axes, two axes extending in a plane extending generally perpendicular to the conveyor run across the labeling station.

7. The item packaging machine as in claim 1 wherein the conveyor run across the labeling station comprises an item receiving platform advanceable along an axis perpendicular to the conveyor run across the labeling station for raising or lowering the item receiving platform relative to the conveyor run at the labeling station; and the at least one labeling verification camera comprises a set of six labeling verification cameras wherein each of the six labeling verification cameras is positioned relative to the labeling station to image a different side of the item on the item receiving platform.

8. The item packaging machine of claim 7, wherein the order information accessed by the processing system includes a print file including the customer identifying indicia and patient-specific information for each of the one or more items in the order to be printed on the label, a location for applying the label containing the patient-specific information and the customer identifying indicia relative to a side of the item positioned on the item receiving platform, and a position of the item receiving platform relative to the conveyor run to position the item so that one of the six labeling verification cameras can capture an image the side of the item on which the item identifying information is located.

9. The item packaging machine of claim 1, wherein the packaging assembly further comprises a document verification camera positioned proximate the packaging assembly and in communication with the processing system, the processing system causing the document verification camera to capture an image of a document verification indicia applied to one or more patient information documents associated with at least one of the items in the order and to compare the document verification indicia captured by the document verification camera to the document verification indicia associated with each of one or more patient information documents associated with the order in the processing system prior to insertion of the one or more patient information documents into the package for each order.

10. A method of fulfilling a plurality of orders that each include one or more items for processing in an item packaging machine, the method comprising:
retrieving from a database, order information regarding an order including item identification information corresponding to each of the one or more items contained in the order and customer information of a customer associated with the order;
imaging an item identification indicia of each of the one or more items in succession, wherein each item identification indicia is associated with the item identification information for a respective one of the items in the order;
for each of the one or more items whose item identification indicia is imaged, prompting placement of the item onto a conveyor in a specified orientation;
positioning the item of the order onto the conveyor with the item identification indicia on the item in the specified orientation and at a specified position on the conveyor;
conveying the item to a verification position on the conveyor;
at the verification position, imaging the item identification indicia on the item and comparing the item identification indicia to the item identification information in the order information retrieved from the database and if the item identification indicia on the item corresponds to the item identification information in the order, applying customer information associated with the item of the order to the item; and
after applying the customer information to the item and with the item at the verification position, capturing verification images that include an image of the item identification indicia on the item and an image of the customer information applied to the item.

11. The method of claim 10, wherein the item identification indicia and the customer information are imaged simultaneously.

12. The method of claim 10, wherein the verification position is on a vertically moving platform.

13. The method of claim 10, further comprising performing a pharmaceutical verification of the item, the pharmaceutical verification including: imaging a selected side of the item prior to applying the customer information to the item; compiling into a file the verification images, the image of the selected side of the item prior to applying the customer information thereto, and a pre-existing image from the item identification information from the database that corresponds to the selected side of the item; comparing the images in the file with at least the item identification information retrieved from the database; and confirming the item is the item in the order or sending the item to be reviewed.

14. The method of claim 10, wherein the order information retrieved from the database includes address information for the customer and the method further comprises:
conveying the item to a packaging verification position;
at the packaging verification position, imaging the customer information on the item and comparing the customer information to the item identification information in the order information retrieved from the database and if the customer information on the item at the packaging verification position corresponds to the item identification information in the order for the item expected at the packaging verification position, advancing the item into a package; and
applying the address information for the customer on the package into which the item is placed.

15. The method as in claim 14 wherein the order information retrieved from the database includes order identification indicia and the method further comprises applying the order identification indicia on the package into which the item is to be placed and imaging the order identification indicia.

16. A method of fulfilling a plurality of orders that each include one or more items for processing in an item packaging machine, the method comprising:
receiving an order container at an item introduction assembly containing one or more items corresponding to an order and imaging a container identification indicia of the order container;
retrieving from a database order information associated with the container identification indicia imaged at the item introduction assembly, the order information corresponding to the order comprising the one or more items contained in the order container imaged at the item introduction assembly;
imaging an item identification indicia of each of the one or more items retrieved in succession from the order container;
for each of the one or more items whose item identification indicia is imaged, prompting placement of the item onto a conveyor in a specified orientation;
placing the item onto the conveyor in a specified position in the specified orientation;
verifying a presence of the item on the conveyor;
indexing the specified position of the item on the conveyor;
incrementally advancing the conveyor with the item in the specified position towards a labeling position;
upon advancement of the item to the labeling position, verifying the item and the specified orientation of the item by imaging the item identification indicia on the item and comparing the item identification indicia to the order information and to the item expected in the specified position;
applying patient-specific information to the item in the labeling position;
verifying the item by imaging, in the labeling position, the patient-specific information applied to the item and comparing the patient-specific information to the order information;
incrementally advancing the conveyor with the item in the specified position towards a packaging assembly;
at the packaging assembly, verifying the item by imaging the patient-specific information applied to the item and comparing the patient-specific information to the order information and to the item expected in the specified position;
applying order identification information to a package;

verifying the package by imaging the order identification information applied to the package and comparing the order identification information with the order information;

advancing the one or more items of the order into the package; and sealing the package.

17. The method of claim 16, wherein the conveyor includes a plurality of V-shaped blocks, and the specified position of the item corresponds to one of the plurality of V-shaped blocks.

18. The method of claim 16, further comprising verifying the item by imaging the item identification indicia of the item simultaneously with imaging of the patient-specific information applied to the item and comparing the item identification indicia to the order information.

19. The method of claim 18, wherein verifying the item further comprises imaging at least one surface of the item prior to applying the patient-specific information thereto; compiling a set of images that includes: the image of the patient-specific information applied to the item, the image of the item identification indicia of the item taken simultaneously with the image of the patient-specific information applied to the item, the image of the at least one surface of the item prior to applying the patient-specific information thereto, and at least one pre-existing image that corresponds to the image of the at least one surface of item; comparing the set of images with the order information; and operating an input device to confirm the labeled item is the item in the order or send the item for review.

20. The method of claim 16, wherein the labeling position is on an item receiving platform that is vertically positionable in an upper position and a lowered position, and imaging in the labeling position is effected by a set of one or more cameras that are vertically positionable with the item receiving platform.

21. The method of claim 16, further comprising printing one or more patient information documents with one or more printers, imaging each of the one or more patient information documents to verify that the one or more patient information documents is associated with the one or more items of the order, and advancing the one or more patient information documents into the package prior to sealing the package.

* * * * *